United States Patent
Jung et al.

(10) Patent No.: US 9,497,656 B2
(45) Date of Patent: Nov. 15, 2016

(54) MEASUREMENT REPORT METHOD IN WIRELESS COMMUNICATION SYSTEM AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/419,200

(22) PCT Filed: Aug. 5, 2013

(86) PCT No.: PCT/KR2013/007052
§ 371 (c)(1),
(2) Date: Feb. 2, 2015

(87) PCT Pub. No.: WO2014/021695
PCT Pub. Date: Feb. 6, 2014

(65) Prior Publication Data
US 2015/0208267 A1  Jul. 23, 2015

Related U.S. Application Data

(60) Provisional application No. 61/679,088, filed on Aug. 3, 2012, provisional application No. 61/679,682, filed on Aug. 4, 2012.

(51) Int. Cl.
*H04W 24/10* (2009.01)
*H04W 64/00* (2009.01)
(52) U.S. Cl.
CPC ............. *H04W 24/10* (2013.01); *H04W 64/00* (2013.01)

(58) Field of Classification Search
CPC ... H04W 24/10; H04W 64/00; H04W 16/18; H04W 76/027; H04W 84/047; H04B 7/2606
See application file for complete search history.

(56) References Cited

U.S. PATENT DOCUMENTS

| 6,438,381 B1 | 8/2002 | Alberth, Jr. et al. |
| 2009/0036116 A1 | 2/2009 | Kim et al. |

(Continued)

FOREIGN PATENT DOCUMENTS

| KR | 10-0508354 B1 | 8/2005 |
| KR | 10-2007-0090799 A | 9/2007 |
| WO | WO 2012/047025 A2 | 4/2012 |

OTHER PUBLICATIONS

Huawei et al., "Impact of the Introduction of Requested Location on User Consent," 3GPP TSG-RAN WG2 Meeting #78, R2-122464, Prague, Czech Republic, May 21-25, 2012 (EPO Server date May 15, 2012), 2 pages, XP050607284.

(Continued)

*Primary Examiner* — Chuong A Ngo
(74) *Attorney, Agent, or Firm* — Birch, Stewart, Kolasch & Birch, LLP

(57) ABSTRACT

Provided is a measurement report method performed by a terminal in a wireless communication system. The method comprises acquiring a measurement result, activating or inactivating positioning for acquiring location information, and transmitting a measurement report message via a network. The method further comprises acquiring location information related to the measurement result when the positioning is activated. The measurement report message includes the measurement result and the location information. The measurement report message includes the measurement result when the positioning is not activated.

11 Claims, 18 Drawing Sheets

(56) References Cited

U.S. PATENT DOCUMENTS

2009/0253440 A1 10/2009 Edge
2010/0323720 A1 12/2010 Jen
2011/0201279 A1* 8/2011 Suzuki .................. H04W 24/10
455/67.11

OTHER PUBLICATIONS

LG Electronics Inc, "Consideration for Location Availability," 3GPP TSG-RAN WG2 #77bis, R2-121781, Jeju, Korea, Mar. 26-30, 2012 (EPO Server date Mar. 20, 2012), pp. 1-6, XP050606465.

LG Electronics Inc, "On-demand Positioning," 3GPP TSG-RAN WG2 #77bis, R2-121785, Jeju, Korea, Mar. 26-30, 2012 (EPO Server date Mar. 20, 2012), pp. 1-3, XP050606469.

Mediatek, "[76#34] MDT Location Information Enhancements," 3GPP TSG RAN WG2 Meeting #77, R2-120634, Dresden, Germany, Feb. 6-10, 2012 (EPO Server date Jan. 31, 2012), pp. 1-25, XP050565486.

Renesas Mobile Europe Ltd., "Discussion on Location Information Availability with MDT," 3GPP TSG-RAN WG2 Meeting #77bis, R2-121652, Jeju, South Korea, Mar. 26-30, 2012 (retrieved on Mar. 19, 2012), 5 pages, XP050606038.

* cited by examiner

MEASUREMENT REPORT METHOD IN WIRELESS COMMUNICATION SYSTEM AND APPARATUS FOR SUPPORTING SAME

CROSS-REFERENCE TO RELATED APPLICATIONS

This application is a the National Phase of PCT International Application No. PCT/KR2013/007052, filed on Aug. 5, 2013, which claims priority under 35 U.S.C. 119(e) to U.S. Provisional Application Nos. 61/679,088, filed on Aug. 3, 2012 and 61/679,682, filed on Aug. 4, 2012, all of which are hereby expressly incorporated by reference into the present application.

BACKGROUND OF THE INVENTION

1. Field of the Invention

The present invention relates to wireless communication, and more particularly, to a measurement report method in a wireless communication system, and an apparatus supporting the method.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

To optimize network performance, a network acquires a measurement result from a user equipment (UE). In this case, the network may effectively optimize the network performance by acquiring location information related to the measurement result together from the UE. Vendors may acquire the measurement result and location information by using the UE to optimize the network, and this is called a minimization of driving test (MDT).

The UE may be configured to perform various types of positioning to acquire the location information. The UE may acquire the location information by performing the positioning, and may report this to the network. When the UE performs the positioning, this may cause additional power consumption or may require to use an additional radio resource.

The reporting of the location information by the UE may be performed at a specific request or command by the network, or may be performed by an operation for network optimization. If the location information is not necessarily acquired or reported in an environment where the UE operates, it may be preferable to deactivate positioning.

SUMMARY OF THE INVENTION

The present invention provides a measurement report method in a wireless communication system, and an apparatus supporting the method.

In an aspect, a measurement report method performed by a terminal in a wireless communication system is provided. The method comprises acquiring a measurement result, activating or deactivating positioning for acquiring location information and transmitting a measurement report message through a network. If the positioning is activated, the method further comprises acquiring location information related to the measurement result, wherein the measurement report message includes the measurement result and the location information, and wherein if the positioning is not activated, the measurement report message includes the measurement result.

If the positioning is not activated, the measurement report message may further include a failure cause indicator indicating a failure cause in the acquisition of the location information related to the measurement result.

The method may further comprise receiving a measurement configuration including information for acquiring the measurement result. The positioning may be activated if the measurement configuration indicates a location information acquisition and if a user consent for the location information acquisition indication is valid. The positioning may be deactivated if the measurement configuration indicates the location information acquisition and if the user consent is not valid.

The user consent may be valid if the terminal camps on a cell in a specific cell list.

The user consent may be valid if the terminal camps on a cell located in a tracking area based on a specific tracking area list.

The user consent may be valid if the terminal camps on a cell corresponding to a public land mobile network (PLMN) in a specific PLMN list.

The positioning may be activated if a remaining battery level of the terminal is greater than or equal to a specific threshold. The positioning may be deactivated if the remaining battery level of the terminal is less than the specific threshold.

The method may further comprise receiving a measurement configuration including information for the measurement result acquisition.

The positioning may be activated if the measurement configuration indicates a location information acquisition and the terminal is in a radio resource control (RRC)_CONNECTED state.

The method may further comprise deactivating the activated positioning if the terminal enters an RRC_IDLE state.

The method may further comprise receiving a logged measurement configuration for a logged minimization driving test (MDT), wherein the positioning is activated if the terminal is in an RRC_IDLE state.

The method may further comprise deactivating the activated positioning if the terminal enters an RRC_CONNECTED state.

The logged measurement configuration may include information indicating a time duration during which the terminal performs a measurement and logging, and further comprising deactivating the activated positioning if the time duration elapses from a time of receiving the logged measurement configuration.

In another aspect, a terminal operating in a wireless communication system is provided. The terminal comprises a radio frequency (RF) unit for transmitting and receiving a radio signal and a processor operatively coupled to the RF unit. The processor is configured for: acquiring a measurement result, activating or deactivating positioning for acquiring location information and transmitting a measurement report message through a network. If the positioning is activated, the processor is configured for acquiring location information related to the measurement result. The measurement report message includes the measurement result and the location information. If the positioning is not activated, the measurement report message includes the measurement result.

In a measurement report method according to an embodiment of the present invention, a user equipment may perform selective positioning on the basis of a condition for positioning activation/deactivation. Accordingly, since the user equipment can report location information related to a measurement result to a network by performing necessary positioning, network performance can be optimized. In addition, unnecessary positioning is excluded so that unnecessary battery consumption can be avoided and unnecessary radio resource occupation can be prevented. A more effective measurement report method can be provided by using such an operation.

DESCRIPTION OF EXEMPLARY EMBODIMENTS

Figure 1:
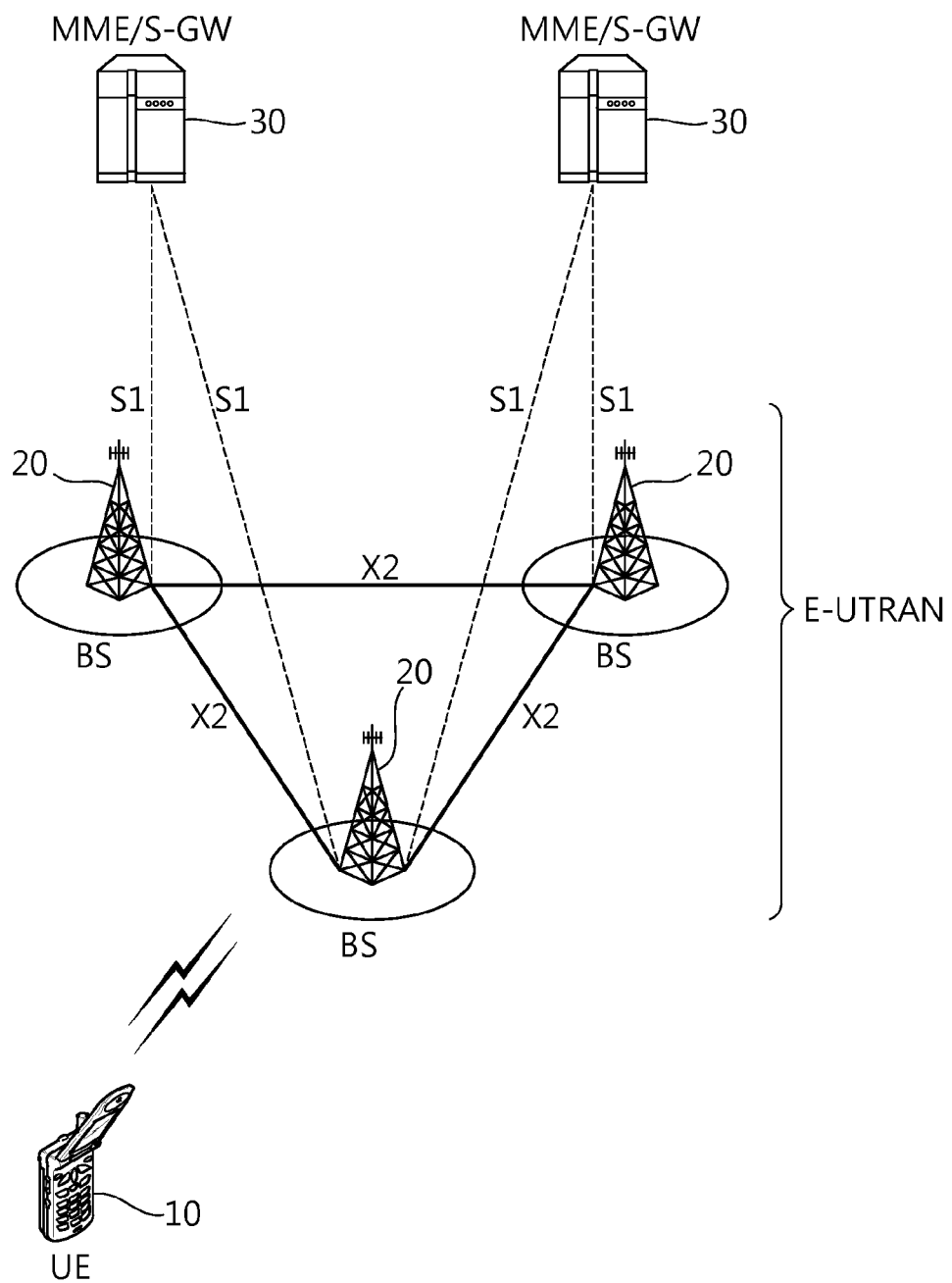
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
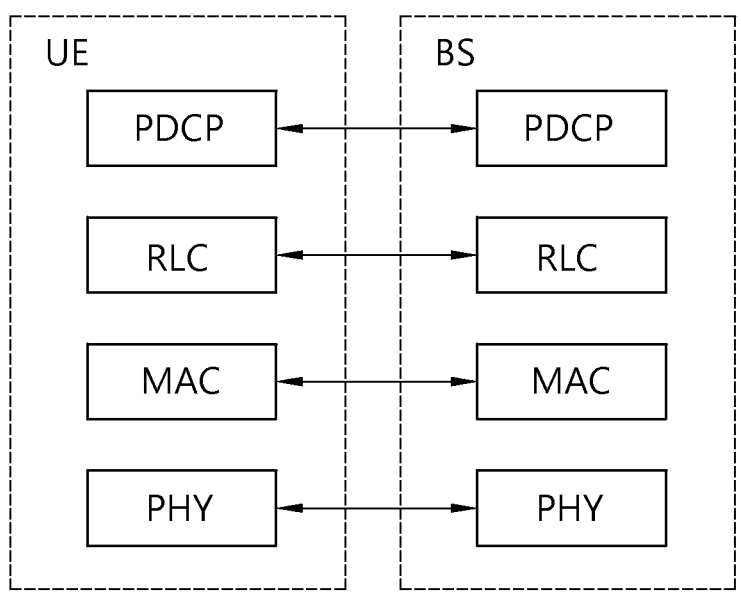
FIG. 2 is a block diagram illustrating a radio protocol architecture for a user plane.
Figure 3:
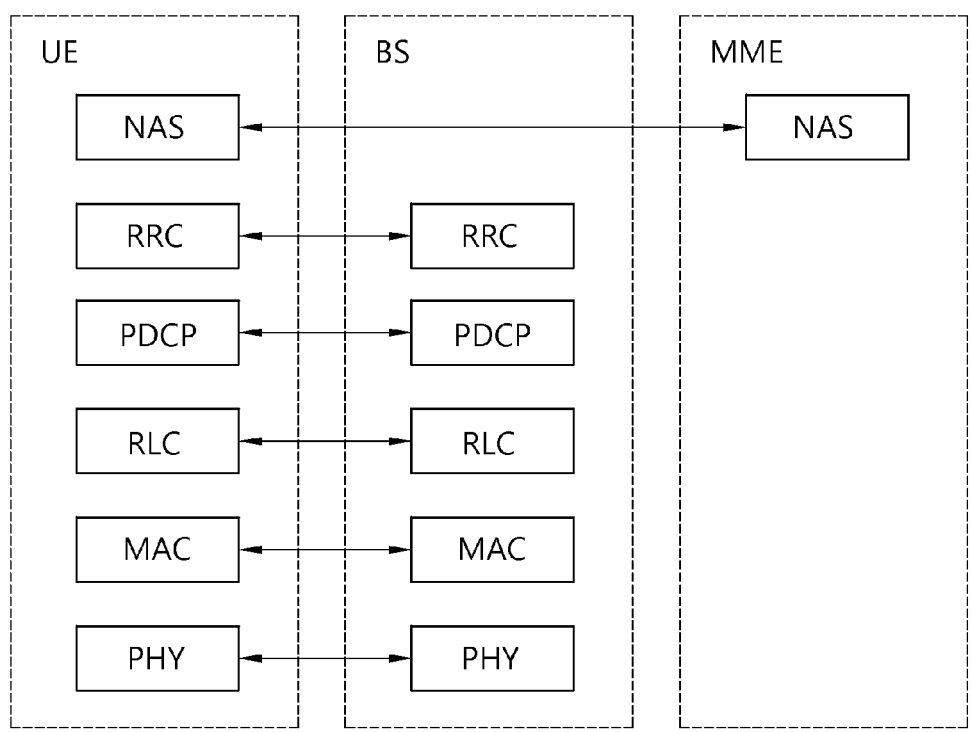
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information.

According to section 5.2.2 of 3GPP TS 36.331 V8.7.0 (2009-09) "Radio Resource Control (RRC); Protocol specification (Release 8)", the system information is divided into a master information block (MIB), a scheduling block (SB), and a system information block (SIB). The MIB allows the UE to know a physical configuration of the corresponding cell, for example, a bandwidth. The SB notifies transmission information of the SIBs, for example, a transmission period and the like. The SIB is a set of system information related to each other. For example, any SIB includes only information on a peripheral cell, and any SIB includes only information on an uplink radio channel used in the UE.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
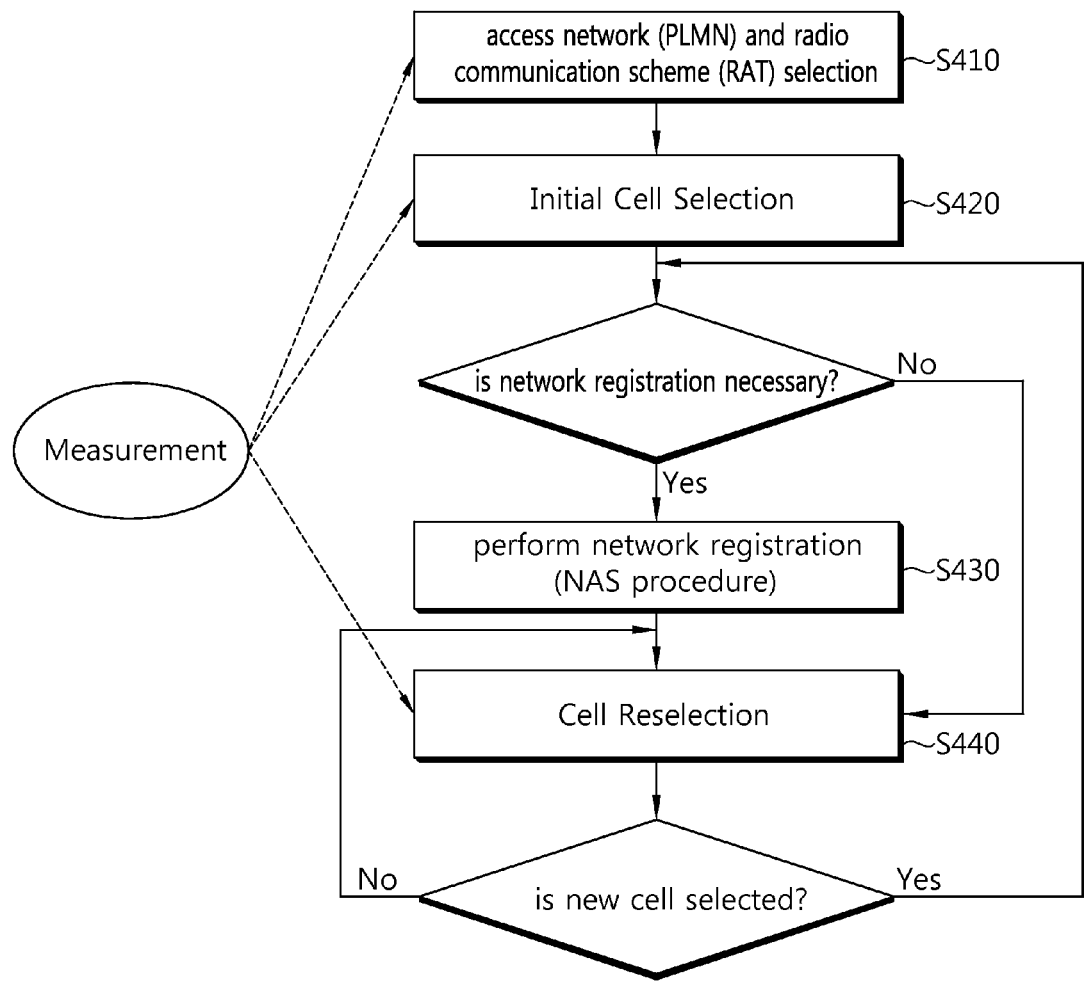
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
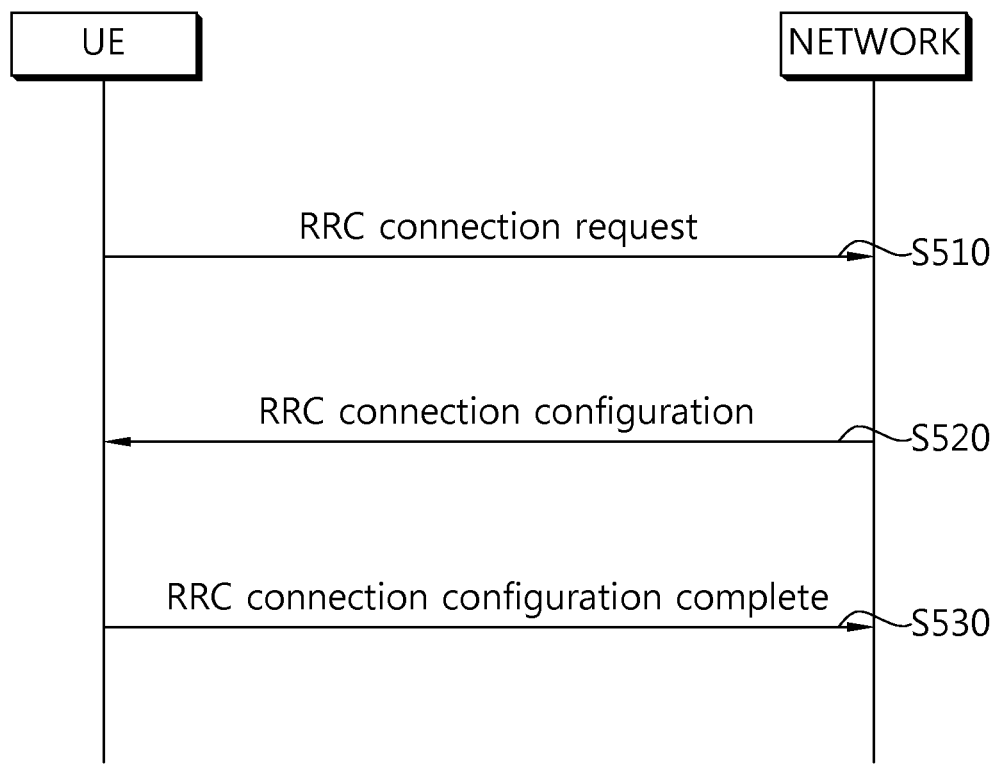
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
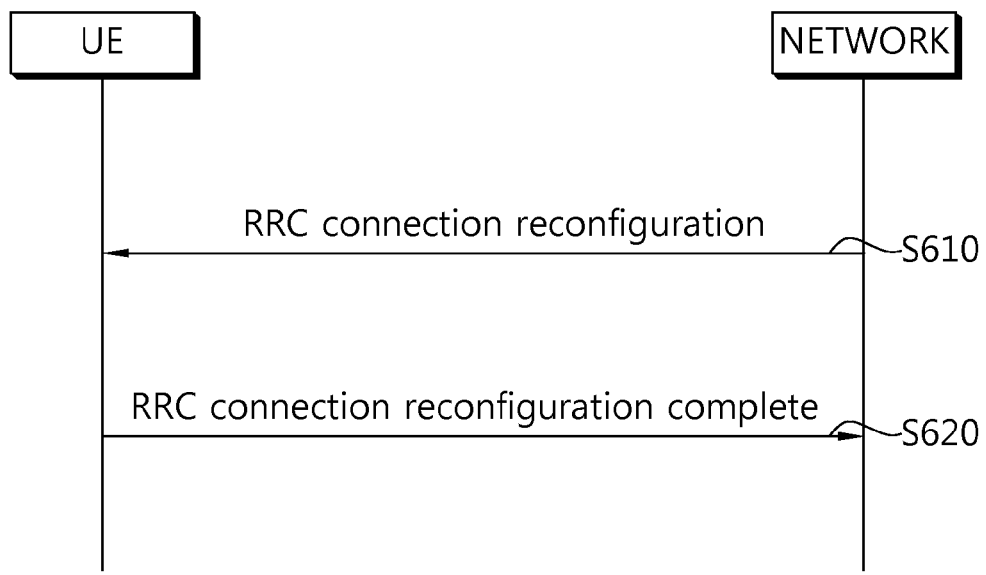
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_s = Q_{meas,s} + Q_{hyst}, R_n = Q_{meas,n} - Q_{offset}$$ [Equation 1]

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequenc}$ When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
  a case where the UE determines that there is a serious problem in the downlink communication link quality based on the radio quality measuring result of the PHY layer (determines that the quality of the PCell is low during the RLM.
  a case where the UE determines that there is a problem in the uplink transmission when a random access procedure is continuously failed in a MAC sub-layer.
  a case where the UE determines that there is a problem in the uplink transmission when uplink data transmission is continuously failed in an RLC sub-layer.
  a case where the UE determines that the handover is failed.
  a case where a massage received by the UE does not pass through an integrity check.

Hereinafter, the RRC connection re-establishment procedure will be described in more detail.

Figure 7:
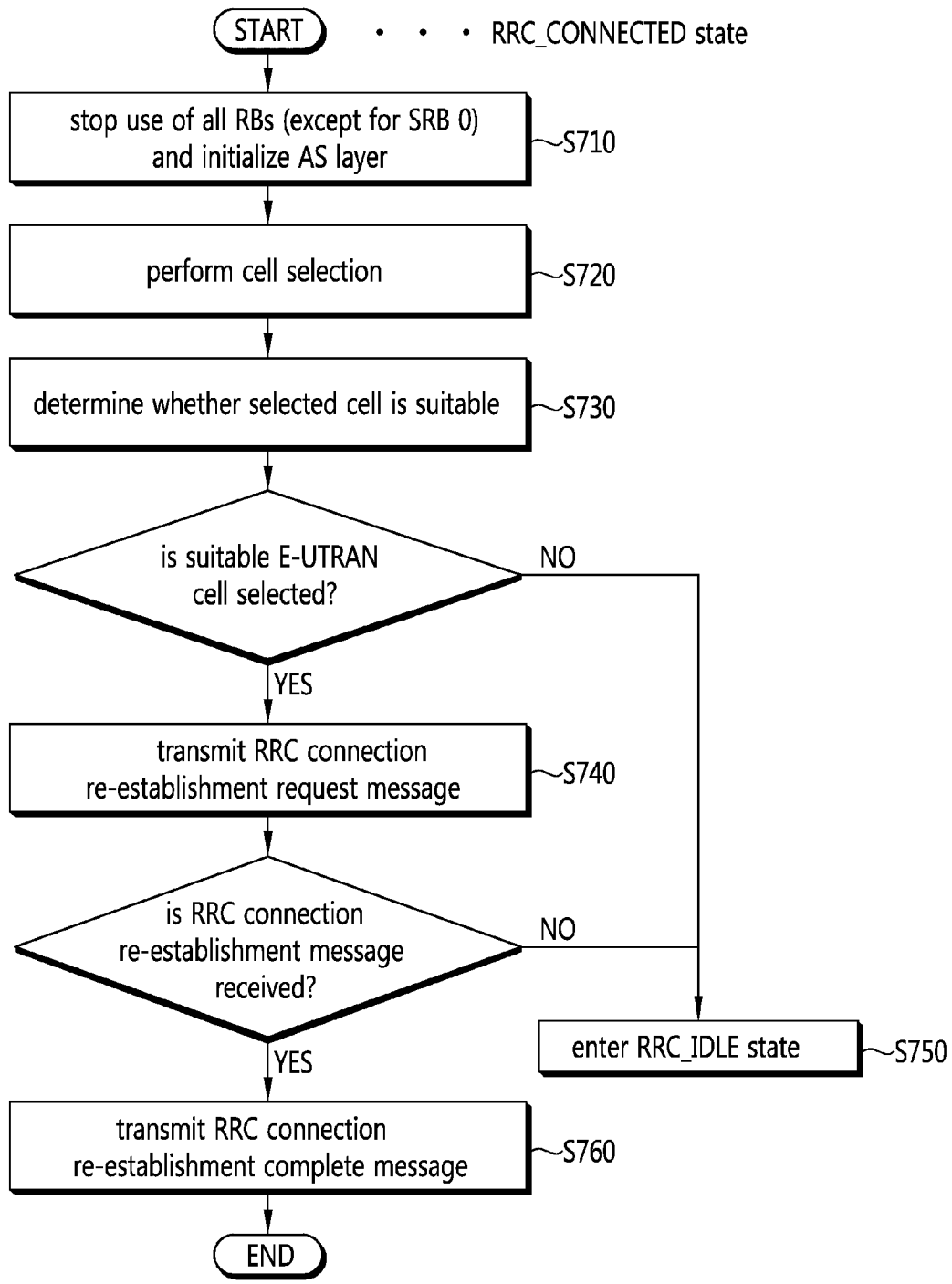
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Next, a report of the RLF will be described.

When the RLF is generated or a handover failure is generated, the UE reports such a failure event to the network in order to support mobility robustness optimisation (MRO) of the network.

After the RRC connection reestablishment, the UE may provide the RLF report to the eNB. The radio measurement included in the RLF report may be used as a potential cause of the failure in order to identify coverage problems. This information may be used for excluding the events in the MRO evaluation for the intra-LTE mobility connection failure and transmitting the events as inputs for other algorithms.

When the RRC connection reestablishment is failed or the UE does not perform the RRC connection reestablishment, the UE is reconnected in the idle mode to generate the valid RLF report for the eNB. For the purpose, the UE stores information on the latest RLF or the handover failure, and may indicate to the LTE cell that the RLF report is valid every subsequent RRC connection (re)establishment and handover, until the RLF report is asked by the network or for 48 hours after the RLF or the handover failure is detected.

The UE maintains the information for the state transition and the RAT change, and returns to the LTE RAT and then indicates the RLF report is valid again.

The validity of the RLF report in the RRC connection configuration procedure indicates that the UE receives disturbance such as connection failure and the RLF report is not transmitted to the network due to the failure. The RLF report from the UE includes the following information.

E-CGI of a last cell (in the case of RLF) which provided the service to the UE or a handover target When the E-CGI is not known, PCI and frequency information are used instead.

E-CGI of the cell which attempted to reestablishment.

E-CGI to the cell which provided the service to the UE, when the last handover is initialized, for example, message 7 (RRC connection reconfiguration) is received by the UE.

Time from the last handover initialization to the connection failure information indicating whether the connection failure is due to the RLF or the handover failure radio measurements position of the failure The eNB receiving the RLF failure from the UE may forward the report to the eNB which has provided the service to the UE before the reported connection failure. The radio measurements included in the RLF report may be used for identifying coverage issues as a potential cause of the radio link failure. This information may be used for excluding the events from the MRO evaluation of the intra-LTE mobility connection failure and transmitting the events as the input of other algorithms.

Subsequently, a tracking collection entity (TCE) is described.

A subscriber and equipment trace provides very specific information on a call level with respect to one or more specific mobiles. This data may be an additional source for information regarding a capability measurement, and allows more intensified monitoring and optimized managements. Unlike the capability measurement which is always a source of information, a trace may be activated by a user's request/necessity during a restricted time duration for a purpose of a specific analysis. The trace plays a very important role in operations such as a determination of a fundamental cause of a mobile which operates erroneously, an improved repair of a malfunction, a resource usage and quality optimization, a radio frequency (RF) coverage control, a capacity improvement, an analysis on a disconnection during a call, and a configuration of a UMTS procedure between a core network and a UTRAN.

A function for logging data on an interface in a call level for a service initiated by a specific user (e.g., IMSI (International Mobile Subscriber Identity)) or a mobile type (e.g. IMEI (International Mobile Equipment Identity) or IMEISV (IMEI and Software Version)) or a user allows to acquire information which cannot be estimated from a capability measurement such as a recognition of final user QoS during a call (e.g., requested QoS vs. provided QoS), a correlation between protocol messages and RF measurements, or an information processing mutual management between specific mobile venders. Traced data is collected in a TCE.

Now, minimization of driving tests (MDT) is described.

The MDT allows a UE to perform a measurement and to report a result thereof, instead of performing a conventional drive test for measuring a cell quality by vendors by using an automobile for a cell coverage optimization. A coverage varies depending on a location of a BS, a deployment of neighboring buildings, and a user's usage environment. Therefore, the vender needs to perform the drive test periodically, which consumes a lot of costs and resources. The MDT for measuring the coverage by the vender by using the UE is proposed to overcome such a shortcoming.

The vendor may aggregate MDT measurement values received from several UEs to create a coverage map which indicates whether a service can be provided across overall areas served by the vender and a distribution of a service quality, and may use it for a network management and optimization. For example, if a coverage problem of a specific area is reported from a UE, the vender may extend a cell coverage of the area by increasing transmission power of an eNB which provides a service to the area. According to this method, a time and cost required for the network optimization can be minimized.

The MDT is created on the basis of a framework of a trace function which is one of operator's tools for operation, administration, and maintenance (OAM). Since the trace function provides the operator with a capability of tracing and logging behaviors of the UE, it is possible to determine a main cause of a malfunction in a UE side. Traced data is collected on a network, which is called a trace collection entity (TCE). For an analysis and an evaluation, the operator uses data collected in the TCE. The trace function used for the MDT includes signaling based on the trace function and managing based on the trace function. The signaling based on the trace function is used to activate an MDT task towards a specific UE, whereas the managing based on the trace function is used to activate the MDT function without being limited to the specific UE.

The MDT may be classified into two types, i.e., a logged MDT and an immediate MDT, according to whether the UE reports measured and stored log data on a non-real time basis or on a real time basis. The logged MDT is a method in which the UE performs an MDT measurement and thereafter logs the data, and transmits it to the network at a later time. On the other hand, the immediate MDT is a method in which, after an MDT measurement, data thereof is immediately transmitted to the network. According to the logged MDT, the UE performs the MDT measurement in an RRC_IDLE state, whereas according to the immediate MDT, the UE performs the MDT measurement in an RRC_CONNECTED state.

Figure 8:
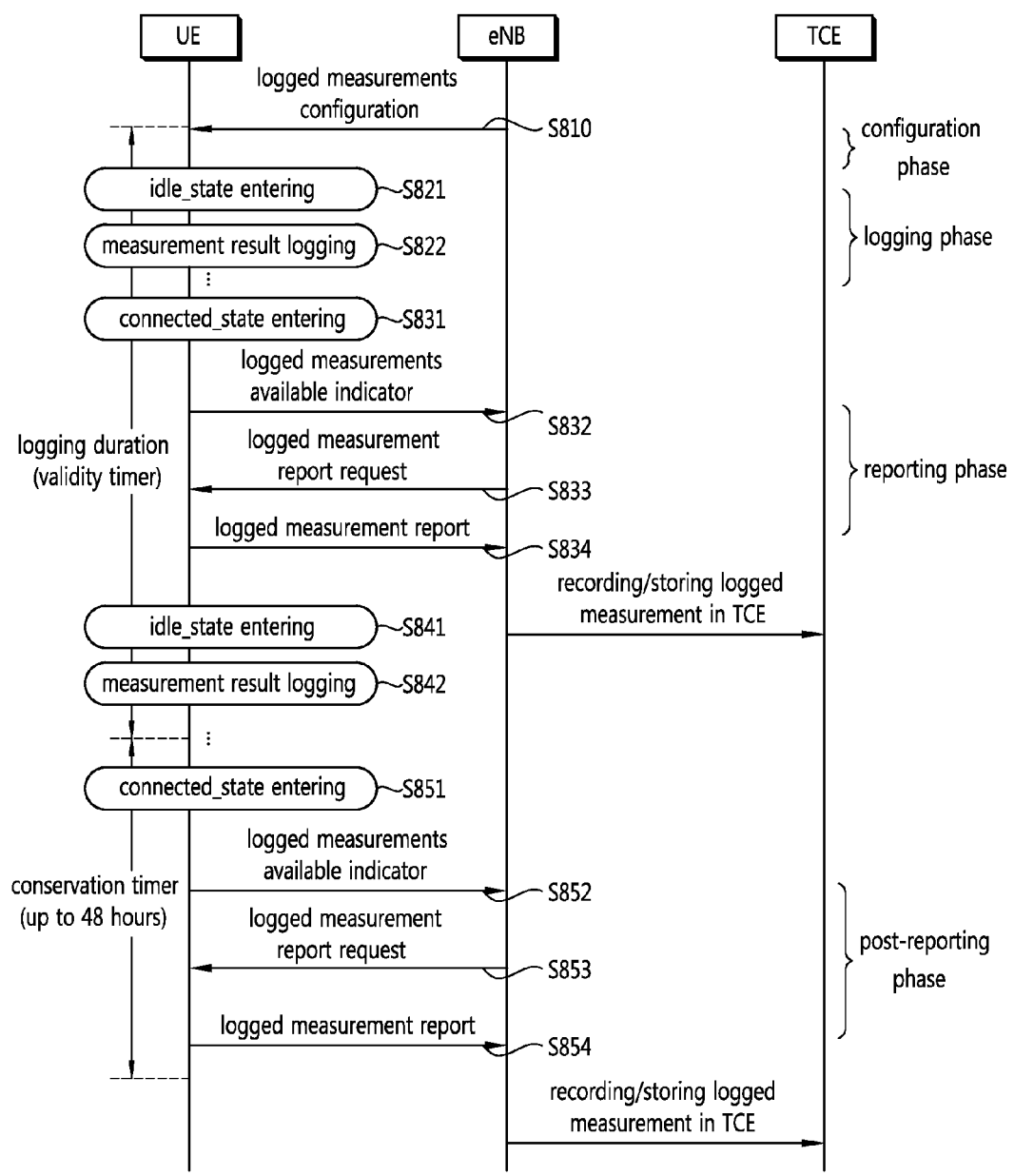
FIG. 8 is a flowchart showing a method of performing a logged MDT.

FIG. 8 is a flowchart showing a method of performing a logged MDT.

Referring to FIG. 8, a UE receives a logged measurements configuration (step S810). The logged measurements configuration may be transmitted through a downlink control channel by being included in an RRC message. The logged measurements configuration may include at least one of a TCE ID, a reference time for performing logging, a logging duration, a logging interval, information on an area configuration, and an MDT PLMN list. The logging interval indicates an interval for storing a measurement result. The logging duration indicates a duration in which the UE performs the logged MDT. The reference time indicates a time used as a reference of the duration for performing the logged MDT. The area configuration indicates an area in which the UE is requested to perform the logging.

Meanwhile, the UE starts a validity timer upon receiving the logged measurements configuration. The validity timer implies a lifetime of the logged measurements configuration, and this may be specified by information on the logging duration. The duration of the validity timer may indicate not only a valid lifetime of the logged measurements configuration but also a validity of measurement results of the UE.

As described above, a procedure in which the UE configures a logged measurement and an overall procedure based thereon is performed is called a configuration phase.

When the UE enters an RRC_IDLE state (step S821), the UE logs a measurement result during a validity timer is running (step S822). A measurement result value may be RSRP, RSRQ, RSCP (received signal code power), Ec/No, etc. Hereinafter, information obtained by logging the measurement result is called logged measurements and/or a measurement result log. A time duration in which the UE logs the measurement result at least one time is called a logging phase.

The operation in which the UE performs the logged MDT based on the logged measurements configuration may vary depending on a location in which the UE exists.

Figure 9:
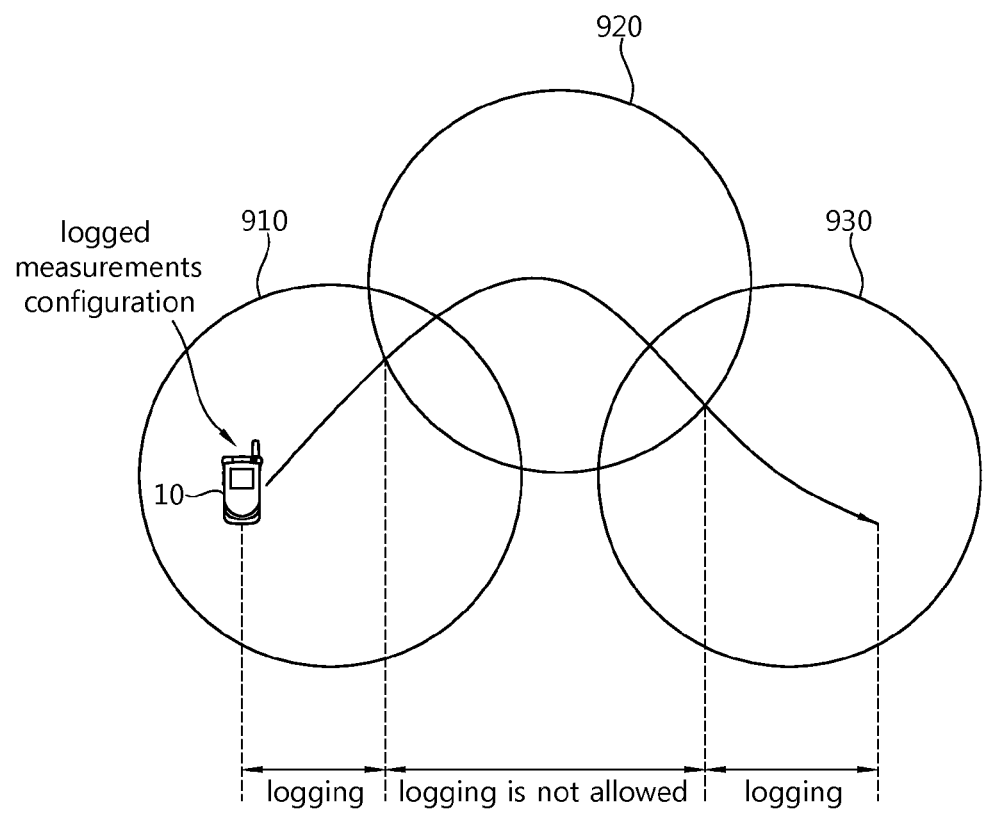
FIG. 9 shows an example of a logged MDT based on a logging area.

FIG. 9 shows an example of a logged MDT based on a logging area.

A network may configure the logging area which is an area in which a UE must perform logging. The logging area may be expressed as a cell list or may be expressed as a tracking area/location area list. If the logging area is configured to the UE, the UE stops the logging when it is out of the logging area.

Referring to FIG. 9, a $1^{st}$ area 910 and a $3^{rd}$ area 930 are areas configured as a logging area, and a $2^{nd}$ area 920 is an area in which logging is not allowed. The UE performs the logging in the $1^{st}$ area 910, but does not perform the logging in the $2^{nd}$ area 920. The UE performs again the logging when moving from the $2^{nd}$ area 920 to the $3^{1-d}$ area 930.

Figure 10:
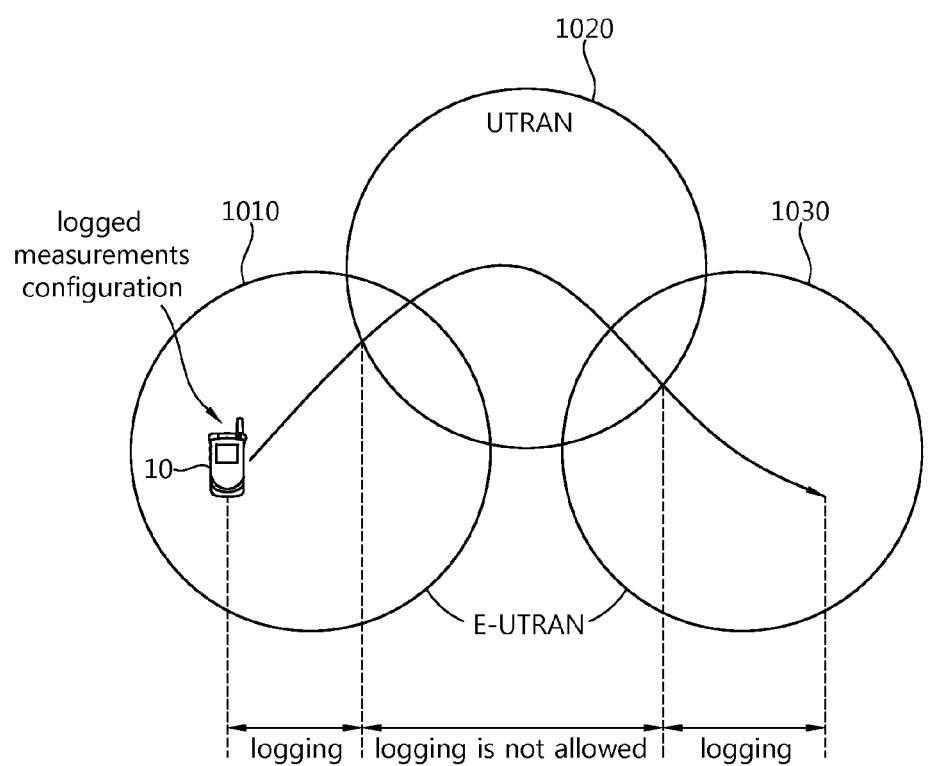
FIG. 10 shows an example of a logged MDT based on an RAT change.

FIG. 10 shows an example of a logged MDT based on an RAT change.

A UE performs logging only when the UE camps on an RAT which receives a logged measurements configuration, and stops the logging in other RATs. However, the UE may log cell information of another RAT other than the RAT on which the UE camps.

A $1^{st}$ area 1010 and a $3^{rd}$ area 1030 are E-UTRAN areas, and a $2^{nd}$ area 1020 is a UTRAN area. The logged measurements configuration is received from the E-UTRAN. The UE does not perform an MDT measurement when entering the $2^{nd}$ area 1020.

Referring back to FIG. 8, the UE enters the RRC_CONNECTED state (step S831), and if the logged measurement to be reported is present, the UE reports to the eNB a fact that the logged measurement to be reported is present (step S832). When an RRC connection is established, or the RRC connection is re-established, or the RRC connection is reconfigured, the UE may report to the eNB a fact that the logged measurement is present. In addition, if the UE performs a handover, it may be reported to a handover target cell that the logged measurement is present. The operation in which the UE reports to the eNB a fact that the logged measurement is present may be an operation of transmission by allowing an RRC message transmitted from the UE to the eNB to include a logged measurements available indicator which is indication information for reporting that the logged measurement is present. The RRC message may be an RRC connection configuration complete message, an RRC connection re-establishment complete message, an RRC reconfiguration complete message, or a handover complete message.

Upon receiving a signal for reporting that the logged measurement is present from the UE, the eNB requests the UE to report the logged measurement (step S833). The operation of requesting to report the logged measurement may be an operation of transmission by allowing an RRC message to include a logged measurement report request parameter regarding information which indicates the request. The RRC message may be a UE information request message.

When the UE is requested from the eNB to report the logged measurement, the logged measurement is reported to the eNB (step S834). The operation of reporting the logged measurement to the eNB may be an operation of transmission by allowing an RRC message to include a logged measurements report including logged measurements. The RRC message may be a UE information report message. When reporting the logged measurement, the UE may report the entirety of the logged measurement owned by the UE to the eNB at a reporting time or may report a part thereof to the eNB. When reporting only the part thereof, the reported part may be discarded.

As described above, a phase of performing a process in which the UE reports to the eNB a fact that the logged measurement is present, receives a request to report from the eNB, and reports the logged measurement based thereon is called a reporting phase.

What is measured by the UE during the logged MDT is performed is primarily related to a radio environment. The MDT measurement may include a cell identity, a cell's signal quality and/or signal strength. The MDT measurement may include a measurement time and a measurement place. The table below exemplifies a content logged by the UE.

TABLE 1

| Parameter(set) | Description |
|---|---|
| Serving cell identity | Global cell identity of Serving cell |
| Measured results of serving cell | Measured RSRP of serving cell<br>Measured RSRQ of serving cell |
| Measured results of neighbor cell | Cell Identities of measured E-UTRA cells,<br>Measured results of E-UTRA cells<br>Cell Identities of measured UTRA cells,<br>Measured results of UTRA cells<br>Cell Identities of measured GERAN cells,<br>Measured results of GERAN cells<br>Cell Identities of measured CDMA 2000 cells,<br>Measured results of CDMA 2000 cells |
| Time stamp | The moment of logging measurement results, calculated as {current time minus absoluteTimeStamp} in second |
| location information | Detailed location information at the moment of logging |

Information logged at different logging times may be stored by being classified according to different log entries as described below.

Figure 11:
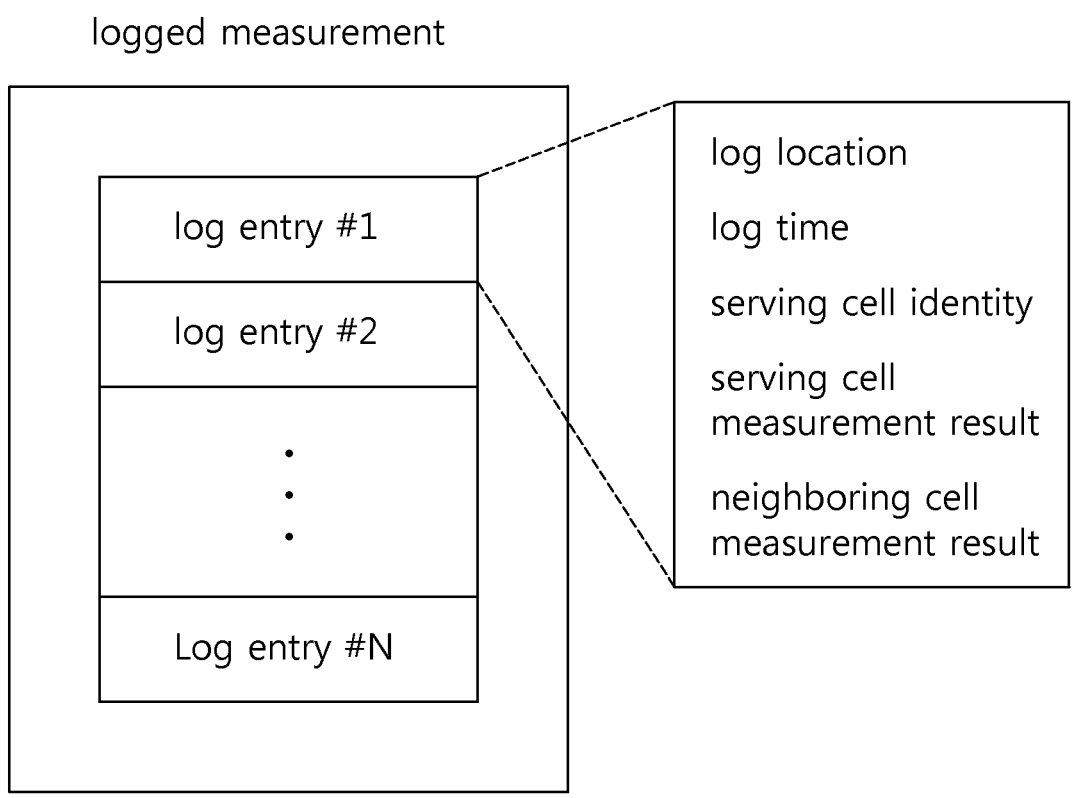
FIG. 11 shows an example of a logged measurement.

FIG. 11 shows an example of a logged measurement.

The logged measurement includes one or more log entries.

The log entry includes a logging location, a logging time, a serving cell identity, a serving cell measurement result, and a neighbor cell measurement result.

The logging location indicates a location measured by the UE. The logging time indicates a time measured by the UE. Information logged at different logging times is stored in different log entries.

The serving cell identity may include a cell identity at a layer 3, which is called a global cell identity (GCI). The GCI is a set of a physical cell identity (PCI) and a PLMN identity.

Meanwhile, the UE may perform logging by analyzing indicators related to a UE performance in addition to the radio environment. For example, the indicator may include a throughput, an erroneous transmission/reception rate, etc.

Referring back to FIG. 8, the aforementioned logging phase and reporting phase may be present in plural times within a logging duration (steps S841 and S842).

When the logged measurement is reported, the eNB may record/store the logged measurement in a TCE.

After a validity timer expires, that is, after a logging duration elapses, if the UE still has the logged measurement which is not yet reported, the UE performs a procedure of reporting the logged measurement to the eNB. A phase in which an overall procedure for this is performed is called a post-reporting phase.

The UE discards a logged measurement configuration after the logging duration ends, and starts a conservation timer. After the logging duration ends, the UE stops the MDT measurement. However, a measurement which has already been logged is not discarded but is maintained. The conservation timer indicates a lifetime of the remaining logged measurement.

If the UE enters an RRC_CONNECTED state before the conservation timer expires (step S851), the logged measurement which is not yet reported may be reported to the eNB. In this case, the aforementioned procedure of reporting the logged measurement may be performed (steps S852, S853, S854). When the conservation timer expires, the remaining logged measurement may be discarded. When the logged measurement is reported, the eNB may record/store the logged measurement in a TCE.

The conservation timer may be configured in advance to the UE by fixing to a predetermined value to the UE. For example, a value of the conservation timer may be 48 hours. Alternatively, the value of the conservation timer may be delivered to the UE by being included in the logged measurements configuration, or may be delivered to the UE by being included in another RRC message.

Meanwhile, when a new logged measurements configuration is delivered to the UE, the UE may update the old logged measurements configuration to the newly obtained logged measurements configuration. In this case, a validity timer may be restarted from a time at which the logged measurements configuration is newly received. In addition, the logged measurement based on the old logged measurements configuration may be discarded.

Figure 12:
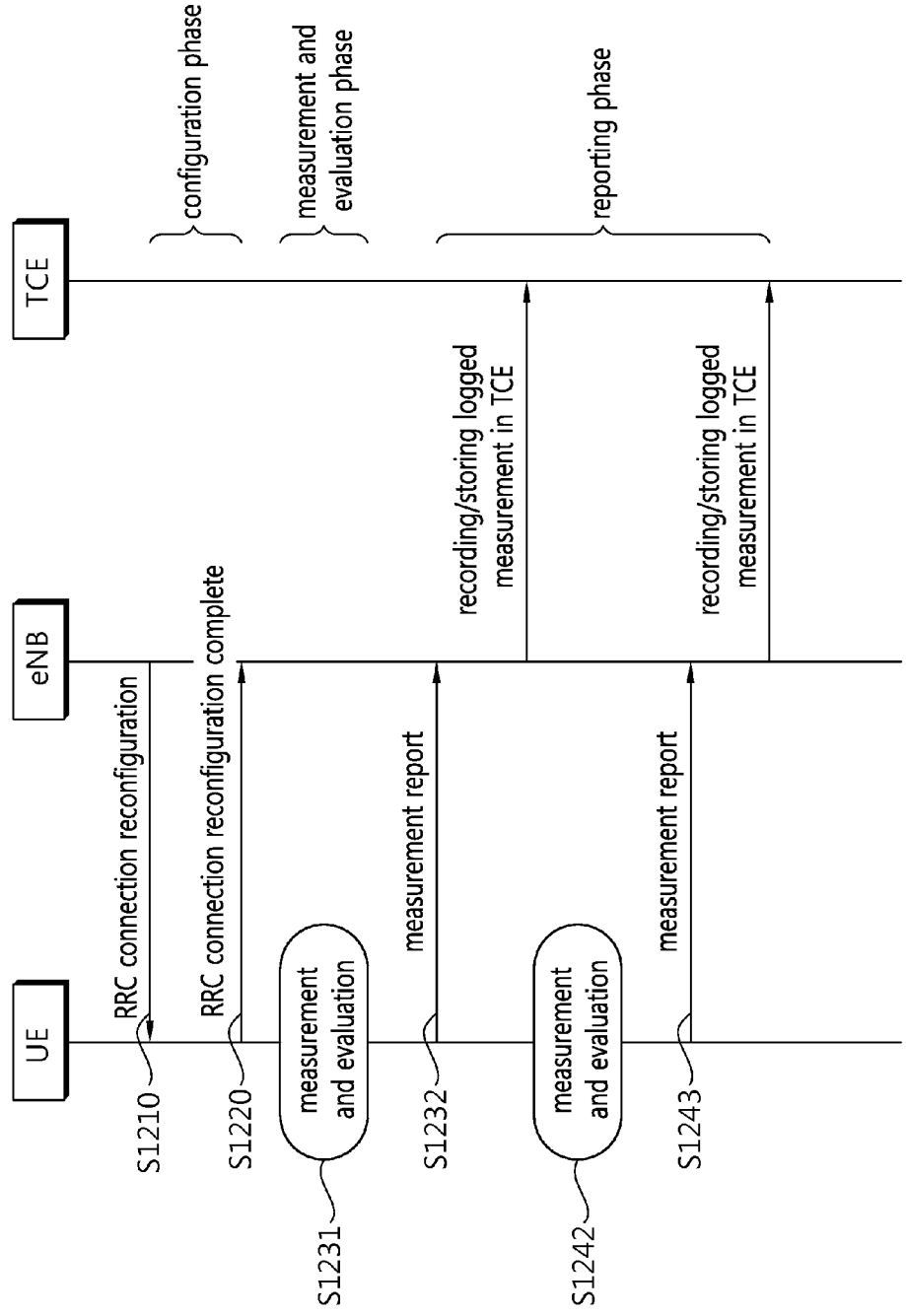
FIG. 12 shows an example of an immediate MDT.

FIG. 12 shows an example of an immediate MDT. The immediate MDT is based on a radio resource management (RRM) measurement and report mechanism, and additionally reports location-related information to an eNB by adding the information when performing a measurement report.

Referring to FIG. 12, a UE receives an RRC connection reconfiguration message (step S1210), and transmits an RRC connection reconfiguration complete message (step S1220). Accordingly, the UE enters an RRC_CONNECTED state. The UE may receive a measurement configuration by receiving the RRC connection reconfiguration message. Although the measurement configuration is received through the RRC connection reconfiguration message in the example of FIG. 12, this is for exemplary purposes only, and thus it may be transmitted by being included in another RRC message.

The UE performs a measurement and evaluation in the RRC_CONNECTED state (step S1231), and reports a measurement result to the eNB (step S1232). In the immediate MDT, if possible, the measurement result may provide accurate location information as shown in an example of global navigation satellite system (GNSS) location information. For a location measurement such as an RF fingerprint, neighbor cell measurement information that can be used to determine a location of the UE may be provided.

Referring to FIG. 12, it can be seen that, after the measurement and evaluation (step S1231) and the report (step S1232), the UE performs a measurement and evaluation (step S1241) and then immediately reports a measurement report to the eNB (step S1242). This is the biggest difference between the logged MDT and the immediate MDT.

Subsequently, an RLF report is described.

To support a mobility robustness optimization (MRO) of a network, when the RLF occurs or a handover failure occurs, the UE reports such a failure event to the network.

After an RRC connection re-establishment, the UE may provide the RLF report to an eNB. A radio measurement included in the RLF report may be used for a potential failure cause to identify coverage problems. This information may be used to exclude such events in an MRO evaluation as to an intra-LTE mobility connection failure so that the events are used again as an input for other algorithms.

If the RRC connection re-establishment fails or the UE cannot perform the RRC connection re-establishment, the UE may perform the re-establishment in an idle mode and thereafter may generate a valid RLF report for the eNB. For such a purpose, the UE may store a most recent RLF or handover failure related information, and may indicate to an LTE cell that the RLF report is valid whenever an RRC connection (re)establishment and a handover are performed thereafter, until the RLF report is forwarded by the network or during 48 hours after the RLF or handover failure is detected.

The UE maintains the information during a state transition and an RAT change. After returning to the LTE RAT, the UE indicates again that the RLF report is valid.

If the RLF report is valid in the RRC connection establishment procedure, it indicates that the UE experiences an interrupt such as a link failure and the RLF report caused by this failure is not yet delivered to the network. The RLF report from the UE includes the following information.

E-CGI of a last cell (in case of RLF) which provides a service to the UE or a handover target. If the E-CGI is not known, PCI and frequency information are used instead.

E-CGI of a cell for which a re-establishment is tried.

E-CGI of a cell which provides a service to the UE, for example, when a message 7 (RRC connection reconfiguration) is received by the UE in a last handover initialization.

Time elapsed from the last handover initialization to a link failure.

Information indicating whether the link failure is caused by an RLF or handover failure.

Radio measurements.

Location of a failure.

An eNB which receives an RLF failure from the UE may forward the report to an eNB which provides a service to the UE before the reported link failure. Radio measurements included in the RLF report may be used to identify coverage issues as a potential cause of the RLF. This information may be used to exclude such events from an MRO evaluation as to an intra-LTE mobility connection failure so that the events are sent again as an input for other algorithms. The RLF report may be considered as a part of MDT.

Subsequently, an accessibility measurement is described.

There are many aspects of dealing with a non-availability measurement of a connection for a UE, and all of common channels and connection procedures are dealt with in this case. In order to report a non-availability of a connection to a network and thus to help parameter optimization for increasing an availability of the connection, the UE performs an accessibility measurement when a connection establishment fails. For the accessibility measurement, the UE performs logging as follows.

A timestamp derived by the use of a relative timer for counting a time between a failure and a report is included. A time of storing the accessibility measurement is 48 hours.

Reporting of the number of transmitted random access preambles is supported.

Indicating of whether to reach a maximum power level is included.

Indicating of whether a contention is detected during a random access procedure for establishing a connection is included.

The availability measurement may be considered as a part of MDT.

Subsequently, a UE mobility state is described. When a UE passes by cells at a fast speed, a movement to neighboring cells may not be achieved at a proper time, and thus a service disabled state may occur. Therefore, the mobility-related parameter can be optimized according to a UE speed to improve the movement of the UE. As such, when the UE determines the mobility state through mobility state estimation (MSE), and scales a mobility-related parameter (e.g., Treselection, TimeToTrigger) according to the determined UE mobility state, the UE may more effectively perform a movement such as a cell selection/reselection/handover.

The UE mobility state may be divided into a high mobility state, a medium mobility state, and a normal mobility state. Each mobility state may be determined on the basis of the number of times of performing a handover by the UE and/or the number of times of performing a cell reselection.

The UE in an RRC_IDLE state performs the cell reselection when a cell reselection condition is satisfied. If the number of times of performing the cell reselection by the UE during a specific time period $T_{CRmax}$ exceeds a first threshold $N_{CR\_H}$, the UE mobility state satisfies a condition of the high mobility state. Meanwhile, if the number of times of performing the cell reselection by the UE during the specific time period $T_{CRmax}$ exceeds a second threshold $N_{CR\_M}$ and does not exceed the first threshold $N_{CR\_H}$, the UE mobility state satisfies a condition of the medium mobility state. If the number of times of performing the cell reselection by the UE during the specific time period $T_{CRmax}$ does not exceed the second threshold $N_{CR\_M}$, the UE mobility state satisfies a condition of the normal mobility state. However, when the UE performs the cell reselection continuously between the two identical cells, it may not be counted as the number of times of performing the cell reselection.

The UE in an RRC_CONNECTED state reports a measurement result and performs a handover if a specific condition is satisfied in a neighboring cell measurement. If the number of times of performing the handover by the UE during a specific time period exceeds the first threshold, the UE mobility state satisfies the condition of the high mobility state. Meanwhile, if the number of times of performing the handover by the UE during the specific time period exceeds a second threshold and does not exceed the first threshold, the UE mobility state satisfies the condition of the medium mobility state. If the number of times of performing the handover by the UE during the specific time period does not exceed the second threshold, the UE mobility state satisfies the condition of the normal mobility state.

The UE in the RRC_IDLE or RRC_CONNECTED state may enter a corresponding mobility state if it is detected that the aforementioned mobility state condition is satisfied. Entering the corresponding mobility state may be a process in which the UE determines that its mobility state is the corresponding mobility state. However, if it is determined that both of the high mobility state condition and the medium mobility state condition are not satisfied during the specific time period, the UE may enter the normal mobility state.

Subsequently, positioning is described.

A positioning function provides a means for determining a geographical location and/or speed of a UE on the basis of a measurement of a radio signal. Location information may be requested by a client (e.g., an application) to which the UE is coupled or a client located within a core network or attached to the core network, and may be reported to the client. The location information may be reported in a standard format, and this may be implemented as a cell-based or geographical coordinate together with a positioning method (or a list of methods) used to acquire an estimated error (uncertainty) of a location and speed of the UE, and if possible, a location estimation.

Most of activated or deactivated UEs in the network may use a LoCation Service (LCS) feature without compromising of signaling capabilities or wireless transmission of an E-UTRAN.

The uncertainty of the location information depends on a method in use, a location of a UE in a coverage region, and a motion of the UE. Various design options (e.g., a size of a cell, an adjustable antenna technique, a path loss estimation value, a timing accuracy, eNB surveys) of the E-UTRAN system may allow a network operator to provide a proper and cost-effective UE positioning method for a market.

There are various possible usage examples for positioning information. Positioning functions may be used by an EPS internally, by value-added network services, by a UE itself or through a network, and by a third-party service. Although the above function may also be used by an essential or additional emergency service, the location service may not be allocated exclusively for the location service.

The positioning method supported in the E-UTRAN may be a network-assisted GNSS method, a downlink positioning method, an enhanced cell ID (E-CID) method, and an uplink positioning method. A hybrid positioning method for applying one or more of the aforementioned methods simultaneously is also possible.

The network-assisted GNSS method is based on a UE having a radio receiver capable of receiving a GNSS signal. The GNSS includes GPS (Global Positioning system), Galileo, GLONASS (Global Navigation Satellite System), SBAS(Space Based Augmentation Systems), and QZSS (Quasi Zenith Satellite System). According to the network-assisted GNSS method, a location of the UE is determined by different GNSSs. The GNSSs may be used individually or at least one of the systems may be combined for use.

The downlink positioning method, also referred to as OTDOA (Observed Time Difference of Arrival), is based on timing measured for downlink signals received from a plurality of eNBs to a UE. The UE measures timing of received signals by using assistance data received from a positioning server. A measurement result is used to determine a location of the UE with respect to neighboring eNBs.

In the cell ID (CID) positioning method, the location of the UE is estimated on the basis of a knowledgement of a serving cell and serving eNB of the UE. Information on the serving eNB and the serving cell may be acquired by paging, tracking area updating, or other methods. The E-CID positioning method implies a technique of using an additional UE and/or a measurement different from an E-UTRAN radio resource to improve a UE location estimation.

Although the E-CID positioning method partially utilizes the same measurement similarly to a measurement control system on an RRC protocol, the UE is not expected to perform an additional measurement only for the positioning in general. For example, an additional measurement configuration or measurement control message is not provided for the positioning, and the UE reports a pre-stored valid measurement, rather than being requested to take an additional measurement action.

The uplink positioning method, also referred to as uplink time different of arrival (UTDOA) is based on measurement timing of a plurality of location measurement units (LMUs) for an uplink signal transmitted from the UE. The LMU measures signal reception timing by using assistance data received from the positioning server, and a measurement result is used to estimate a location of the UE.

Figure 13:
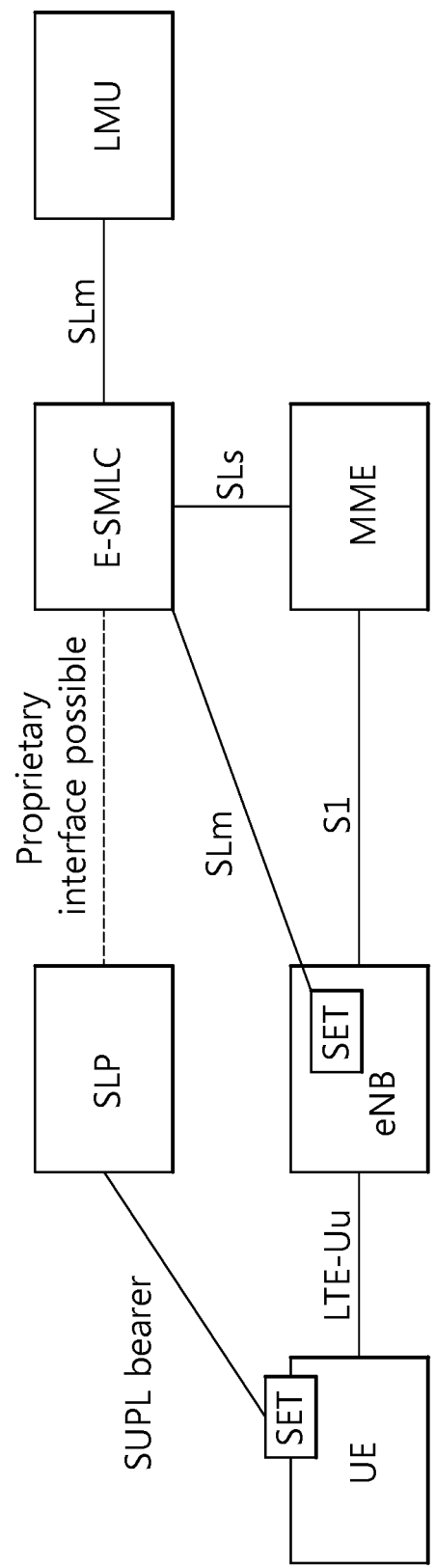
FIG. 13 shows an example of a wireless communication system structure to which positioning of a UE is applied according to an embodiment of the present invention.

FIG. 13 shows an example of a wireless communication system structure to which positioning of a UE is applied according to an embodiment of the present invention.

An MME may receive a request for a location service related to a specific target UE from a specific entity (e.g., a global mobile location center (GMLC) or a UE). In addition, for a purpose of an IP multimedia subsystem emergency call (IMS) from the UE, the MME may determine to start the location service for the specific target UE. Accordingly, the MME transmits a location service request to an evolved-service mobile location center (E-SMLC).

The E-SMLC handles the location service request. The E-SMLC may deliver assistance data to the target UE to facilitate UE-based and/or UE-assisted positioning. The E-SMLC may perform positioning of the target UE. When the location service is handled according to the uplink method, the E-SMLC may deliver configuration data to selected location measurement units (LMUs). Accordingly, the E-SMLC may return a result of the location service to the MME. Meanwhile, if the location service is requested by an entity (i.e., UE or E-SMLC) other than the MME, the MME may return a result thereof to a corresponding entity.

An SUPL location platform (SLP) is a secure user plane location (SUPL) entity which serves for positioning on a user plane.

In order to assist the positioning of the target UE and a location assistance data delivery to the UE, location related functions are provided, and these functions may be implemented by being properly distributed in the structure of FIG. 13. Meanwhile, location service-related operations that can be performed between these entities may be found in FIG. 14.

Figure 14:
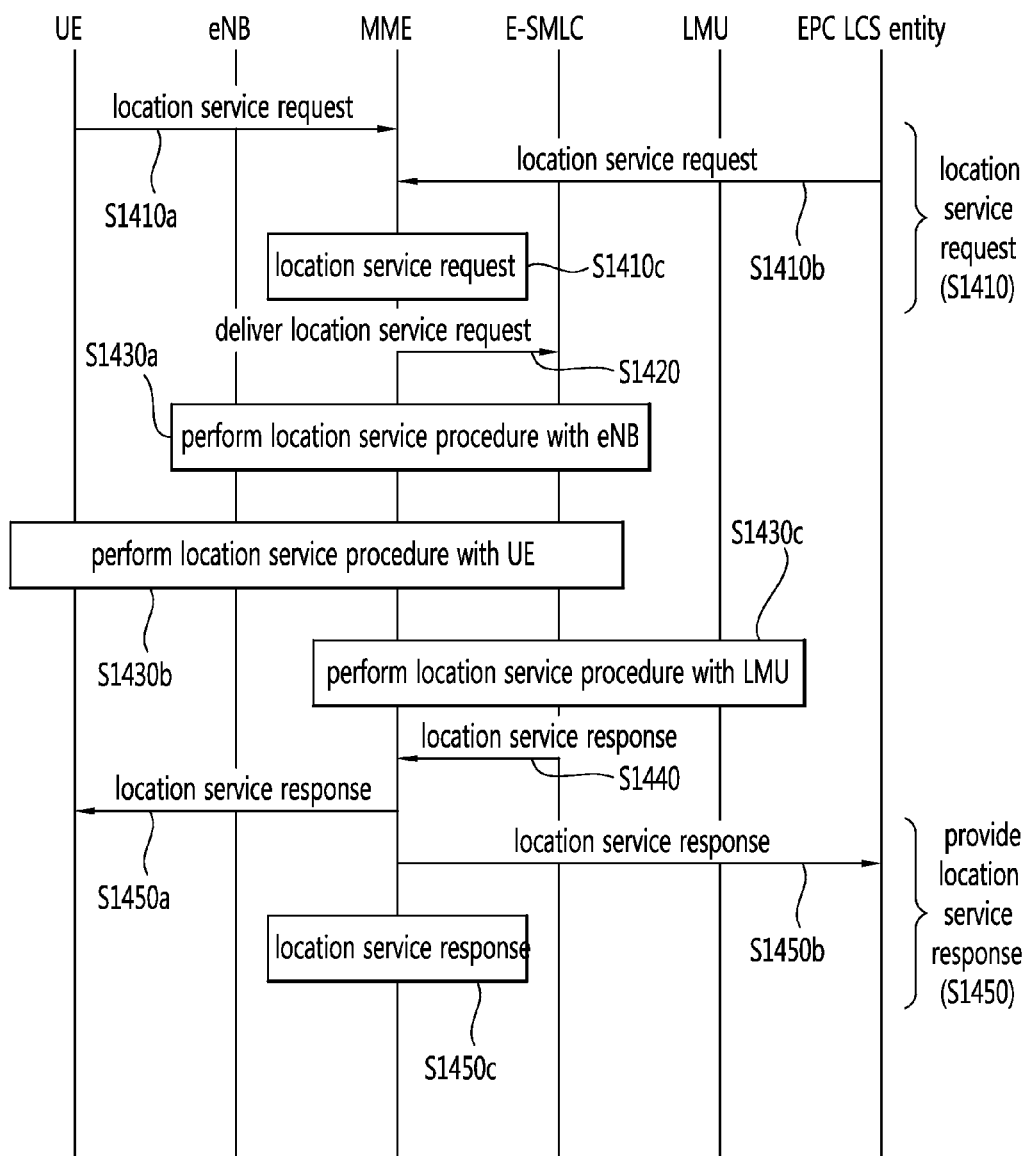
FIG. 14 shows an overall procedure for a location service according to an exemplary embodiment of the present invention.

FIG. 14 shows an overall procedure for a location service according to an exemplary embodiment of the present invention.

If an MME receives a location service request when a UE is in an ECM-IDLE state, the MME establishes a signaling connection with the UE and performs a network triggering service request to allocate a specific eNB. It is assumed that the UE enters a connected state before the overall procedure of FIG. 14 is initiated.

A location service is initiated at a location service request of a specific entity (step S1410). The location service request may be initiated as follows.

A UE may request a serving MME on an NAS level to provide a location service (e.g., positioning or an assistance data delivery) (step S1410a). A specific entity in an evolved packet core (EPC) such as GMLC may request the serving MME to provide a location service (e.g., positioning) (step S1410b). The serving MME for a target UE may determine whether the location service is necessary, and if necessary, may request the location service autonomously (step S1410c). This may be for locating the UE at a specific location or for an emergency call.

The MME delivers the location service request to an E-SMLC (step S1420).

The E-SMLC performs a location service procedure in response to the location service request (step S1430). The E-SMLC may perform the location service procedure with respect to a serving eNB of the UE (step S1430a). A positioning measurement or an assistance data acquisition may be included herein. Together with the step S1430a or instead of the step S1430a, for downlink positioning, the E-SMLC may perform the location service procedure with respect to the UE (step S1430b). A location estimation or a positioning measurement acquisition or a location assistance data delivery to the UE may be included herein. For uplink positioning (e.g., UTDOA), together with the step S1430a, the E-SMLC may perform the location service procedure with respect to one or more LMUs for a target UE (step S1430c). A positioning measurement acquisition may be included herein.

The E-SMLC provides a location service response to the MME (step S1440). The location service response may include necessary results, for example, an indicator indicating a success or a failure and/or a location estimation for the UE.

The location service response is provided to an entity which requests the location service (step S1450). If the location service request is initiated from the UE as shown in the step S1410a, the MME may deliver the location service response to the UE (step S1450a). In this case, the location service response may include a requested or necessary result such as the location estimation of the UE. If the location service request is initiated by a specific entity in an EPC as shown in the step S1410b, the MME may deliver the location service response to the entity (step S1450b). In this case, the location service response may include the requested or necessary result such as the location estimation of the UE. If the location service request is initiated autonomously by the MME as shown in the step S1410c, the location service response received from the E-SMLC may be used for the location service (step S1450c).

Hereinafter, a positioning operation in a wireless communication system is described.

Unlike a location service assistance for specific UEs, an E-SMLC may interact with elements in an E-UTRAN to acquire measurement information supporting one or more positioning methods for all UEs.

Assistance for a downlink positioning method: The E-SMLC may acquire location-related information to assist the downlink positioning method, and may interact with an eNB accessible from an MME having a signaling access to the E-SMLC. The information may include timing information for the eNB related to an absolute GNSS time or timing for other eNBs. In addition, the information may include information for cells to be assisted, and an example thereof may include a positioning reference signal (PRS) schedule. A signaling access between the E-SMLC and the eNB may be performed through the MME which maintains a signaling access with respect to the E-SMLC and the eNB.

Assistance for an uplink location method: The E-SMLC may interact with a serving eNB of the UE to collect target UE configuration information to assist the uplink positioning method. The configuration information may include information requested from an LMU to acquire an uplink time measurement. The E-SMLC may indicate to the serving eNB a fact that it is necessary to transmit an SRS signal to the UE for uplink positioning. If the requested resource is not available, the eNB may allocate other resources and may report the resource allocation to the E-SMLC. The E-SMLC may request the LMU to perform an uplink time measurement and to report a result thereof.

Hereinafter, an operation of entities related to UE positioning in a wireless communication system is described in greater detail.

A UE may transmit a signal required for an uplink-based UE location estimation. Further, a downlink signal from different resources may be measured similarly to the E-UTRAN and other GNSS systems. The measurement method may be determined based on the selected positioning method.

The UE may access a location service application by including a location service application or by using communication with a network or another application existing in the UE. The location service application includes a measurement and calculation function required to determine a location of the UE with an assistance of the network requested or without an assistance of the network.

For example, the UE may include an independent positioning function (e.g., GPS), and may report a result thereof independent of E-UTRAN transmission. The UE having the independent positioning function may utilize assistance information acquired from the network.

An eNB is an element of an E-UTRAN network which provides a measurement result for a location estimation. The eNB may measure a radio signal for a target UE, and may transmit a measurement thereof to an E-SMLC. The eNB may perform a measurement in response to the request, or may automatically perform a measurement and report regularly or at an occurrence of a change in a specific radio state. The eNB may configure a UE to transmit a periodic SRS.

The E-SMLC manages an assistance of a location service for the target UE, and positioning of the UE and an assistance data delivery to the UE are included herein. The E-SMLC may interact with a serving eNB of the UE to acquire a location measurement for the UE. The measurement includes an uplink measurement by the eNB and a downlink measurement by the UE. The downlink measurement by the UE may be provided to the eNB through other functions such as a handover assistance. The E-SMLC enables the uplink positioning method and may interact with the eNB to indicate to a serving eNB a fact that the UE needs to indicate SRS signal transmission in order to acquire target UE configuration data required when an LMU calculates signal timing. The E-SMLC may select a set of LMUs used for UTDOA positioning. The E-SMLC may interact with selected LMUs to request a timing measurement. The E-SMLC may interact with a target UE to deliver assistance data when there is a request or to acquire a location estimation.

For the positioning of the target UE, the E-SMLC may determine a positioning method to be used on the basis of factors including an LCS client type, a requested QoS, a UE positioning capability, an eNB positioning capability, etc. Accordingly, the E-SMLC may apply the positioning method to an UE and/or a serving eNB. The positioning method includes a location estimation for a UE-based positioning method and/or a location estimation for a UE-assisted and network-based positioning method. The E-SMLC may combine all received results, and may determine a single location estimation for the target UE. Additional information such as an accuracy and speed of the location estimation may also be determined.

The LMU performs a measurement and delivers a measured result to the E-SMLC. All location measurements acquired by the LMU may be provided to the E-SMLC which requests the measurement. The UE positioning request may accompany a measurement by a plurality of LMUs.

For a purpose of network performance optimization, a network may command a UE to report a measurement result and location information related thereto together. An MDT operation such as the aforementioned logged MDT and immediate MDT corresponds to an operation by which the network commands the UE to report a measurement result and location information. The UE acquires the measurement result in response to a command of the network, and may attempt to acquire location information related to the acquired measurement result.

When the UE acquires the location information through the positioning, an additional power consumption of the UE may be caused or a use of an additional radio resource may be requested. If necessary, the acquiring of the location information and reporting this may facilitate a network optimization and an effective operation of the UE. Otherwise, the positioning operation causes an unnecessary power consumption of the UE, or increases inefficiency in a sense that the UE unnecessarily uses a radio resource. There is a need to provide an effective measurement report method for compensating such a problem.

The present invention proposes a measurement report method based on selective positioning when a UE selectively activates or deactivates the positioning.

The UE may start a location information acquisition by activating the positioning. The activating of the positioning by the UE may be performed according to a positioning activation command from the network. For example, the positioning may be activated when the UE receives a measurement configuration for an MDT (i.e., a measurement configuration for a logged MDT or an immediate MDT).

Meanwhile, the UE may be configured to activate the positioning only when the positioning activation command is valid. If the positioning activation command is not valid, the UE may deny the positioning activation command and may not activate the positioning. The positioning activation command may not be valid in the following cases.

The UE does not have a valid user consent related to the positioning activation command.

A validity of the positioning activation command is not affirmed by the user consent.

The validity of the positioning activation command for a current serving cell cannot be guaranteed.

The validity of the positioning activation command for a current PLMN (RPLMN) cannot be guaranteed.

Thereafter, the positioning activation/deactivation of the UE may be performed according to whether a specific condition is satisfied. Hereinafter, a condition for the positioning activation/deactivation and a UE operation based thereon are described in greater detail.

1. Positioning Activation/Deactivation Based on User Consent

A UE may activate and/or deactivate positioning based on a validity of a user consent. If the positioning is initiated by a BS such as an eNB, the UE may deactivate the positioning based on the validity of the user consent related to a positioning activation command by the BS. For example, if the positioning activation command by the BS is triggered for a network optimization similarly to an MDT, the UE may determine whether the positioning is deactivated on the basis of the validity of the user consent regarding the positioning activation command related to the MDT. A positioning deactivation condition related thereto may include the following cases.

a) A case where there is no valid user consent related to the positioning activation command.

b) A case where the positioning activation command cannot be affirmed by the user consent.

c) A case where a validity of the positioning activation command for a current serving cell cannot be guaranteed.

d) A case where the validity of the positioning activation command for a current PLMN (RPLMN) cannot be guaranteed.

As to the user consent for a task related to a network performance optimization, a validity thereof may be guaranteed according to the following condition.

a) Cell list: If a UE camps on a cell included in a cell list, the user consent has the validity. If the UE camps on a cell other than the cell included in the cell list, the user consent is no longer valid.

b) Tracking area list: If the UE camps on a cell in an area specified by a tracking area list, the user consent has the validity. If the UE camps on the cell other than the cell included in the specified area, the user consent is no longer valid.

c) PLMN list: If the UE camps on a cell corresponding to a PLMN in a PLMN list, the user consent has the validity. If the UE camps on the cell corresponding to a PLMN other than the PLMN in the PLMN list, the user consent is no longer valid.

d) Country code list: If the UE camps on a cell belonging to a country in a country code list, the user consent has the validity. If the UE camps on a cell belonging to a country other than the country in the list, the user consent is no longer valid.

e) Maximum work time: If the UE performs a related task by exceeding a maximum work time, the user consent is no longer valid.

If the aforementioned condition is satisfied, the UE may deactivate the positioning. The positioning deactivated by the UE may be limited to positioning initiated at a positioning activation command by a BS. That is, the UE may continuously perform positioning triggered by other causes different from a positioning activation command requested by the BS.

If the positioning is deactivated, the UE may report to the network a fact that the positioning is deactivated.

2. Positioning Activation/Deactivation Based on Remaining Battery Level

Positioning may be activated or deactivated on the basis of a remaining battery level of a UE. If the remaining battery level is less than a specific threshold, the UE may deactivate the positioning. If the remaining battery level is greater than or equal to the specific threshold, the UE may activate the positioning.

The remaining battery level may be considered as a ratio of a current remaining battery capacity against a total battery capacity. In this case, a threshold may be given as a specific ratio value.

A threshold for positioning activation/deactivation may be a value provided from a network. In this case, the threshold may be provided to the UE by being included in a measurement configuration (e.g., a measurement configuration for MDT or a logged measurement configuration)

having a function of a positioning activation command. Alternatively, the threshold may be a specific value predetermined in the UE itself.

The positioning deactivated by the UE may be limited to positioning initiated at a positioning activation command by a BS. That is, the UE may continuously perform positioning triggered by other causes different from a positioning activation command requested by the BS.

If the positioning is deactivated, the UE may report to the network a fact that the positioning is deactivated.

3. Positioning Activation/Deactivation Based on Cell, Network Area (Tracking Area), and/or PLMN Positioning may be activated only for a specific cell, a specific network area, or a specific PLMN. Such a positioning activation/deactivation condition may be properly applied when a UE performs an MDT. A measurement configuration for performing the MDT may be provided to the UE. The measurement configuration may be a logged measurement configuration for a logged MDT or a measurement configuration for an immediate MDT. The performing of the positioning for the MDT by the UE may be limited to a specific cell, a specific tracking area, or a specific PLMN. Information on such a limitation may be provided to the UE by being included in the measurement configuration.

When the UE performs the positioning on the basis of the measurement configuration for the MDT, whether to continuously perform the MDT may be determined according to a current cell, a current tracking area, or a current PLMN. That is, according to whether the current cell, the current tracking area, or the current PLMN satisfies a configuration of executing the MDT requested by the measurement configuration for the MDT, the UE may activate or deactivate the positioning.

If the current cell, the current tracking area, or the current PLMN does not satisfy the condition of performing the MDT, the UE may determine to deactivate the positioning. If the current cell is not included in a cell list for the MDT in the measurement configuration, the UE may determine to deactivate the positioning. If the tracking area in which the UE currently exists is not included in the tracking area list for the MDT in the measurement configuration, the UE may determine to deactivate the positioning. If a PLMN of a cell in which the UE currently exists is not included in a PLMN list for the MDT in the measurement configuration, the UE may determine to deactivate the positioning.

On the contrary, if the current cell, the current tracking area, or the current PLMN does not satisfy the configuration of performing the MDT, the UE may determine to activate the positioning. If the current cell is included in a cell list for the MDT in the measurement configuration, the UE may determine to activate the positioning. If the tracking area in which the UE currently exists is included in the tracking area list for the MDT in the measurement configuration, the UE may determine to activate the positioning. If a PLMN of a cell in which the UE currently exists is included in a PLMN list for the MDT in the measurement configuration, the UE may determine to activate the positioning. This may be easily applied not only to a case where the positioning is initially activated but also to a case where the condition of performing the MDT is satisfied by moving to a new cell after the positioning is deactivated in a previous cell.

The positioning deactivated by the UE may be limited to positioning initiated at a positioning activation command by a BS. That is, the UE may continuously perform positioning triggered by other causes different from a positioning activation command requested by the BS.

If the positioning is deactivated, the UE may report to a network a fact that the positioning is deactivated. If the positioning is activated, the UE may report to the network a fact that the positioning is activated.

4. Positioning Activation/Deactivation Based on Serving RAT

Positioning may be activated or deactivated based on a serving cell RAT of a UE. That is, if the UE receives a service from a cell of RAT not supporting an MDT operation (e.g., not capable of performing logging and/or reporting), the UE may determine to deactivate the positioning. On the other hand, if the UE receives the service from a cell of RAT supporting the MDT operation (e.g., capable of performing logging and/or reporting), the UE may determine to activate the positioning.

The positioning deactivated by the UE may be limited to positioning initiated at a positioning activation command by a BS. That is, the UE may continuously perform positioning triggered by other causes different from a positioning activation command requested by the BS.

If the positioning is deactivated, the UE may report to the network a fact that the positioning is deactivated. If the positioning is activated, the UE may report to the network a fact that the positioning is activated.

5. Positioning Activation/Deactivation Based on RRC State

Positioning may be activated or deactivated based on an RRC state of a UE. Such a positioning activation condition may be properly applied to an MDT operation.

The UE may initiate the positioning when performing the logged MDT according to the logged measurement configuration. A logged MDT operation by the UE is performed according to an RRC state of the UE. In such an environment, the UE may determine to deactivate the positioning when being released from an RRC_IDLE state (i.e., when entering an RRC_CONNECTED state). The UE may determine to activate the positioning when entering the RRC_IDLE state (i.e., when being released from the RRC_CONNECTED state).

The UE may perform an immediate MDT according to a measurement configuration including information which commands reporting of location information. The immediate MDT operation by the UE is performed based on the RRC_CONNECTED state. In such an environment, the UE may determine to deactivate the positioning when being released from the RRC_CONNECTED state (i.e., when entering the RRC_IDLE state). The UE may determine to activate the positioning when entering the RRC_CONNECTED state (i.e., when being released from the RRC_IDLE state).

The positioning deactivated by the UE may be limited to positioning initiated at a positioning activation command by a BS. That is, the UE may continuously perform positioning triggered by other causes different from a positioning activation command requested by the BS.

If the positioning is deactivated, the UE may report to the network a fact that the positioning is deactivated.

6. Positioning Deactivation Based on Specific Time

A UE may determine to deactivate positioning if a time of activating and operating the positioning is equal to or greater than a specific threshold time. For example, a UE currently performing a logged MDT operation may determine to deactivate the positioning if a time duration of performing the positioning is elapsed by a logging duration time.

7. Positioning Activation/Deactivation Based on Configuration Related UE Operation Positioning may be activated or deactivated based on a configuration related to a UE operation. The UE may determine to deactivate the positioning if a configuration including information for performing an operation including the positioning is released or if the configuration no longer requires the positioning.

The positioning may be deactivated based on a configuration related to a measurement/report of the UE. The UE may determine to deactivate the positioning if an MDT configuration is released during operating the positioning by activating it according to the MDT configuration. For example, if a logging duration time is elapsed during operating with a logged MDT, a logged measurement configuration may be no longer valid. Accordingly, the UE may deactivate the positioning. In addition, the UE may determine to deactivate the positioning if corresponding indication information in a measurement configuration is no longer set in the measurement configuration during the UE operates the positioning by activating it according to the indication information in the measurement configuration for instructing that location information needs to be included.

The positioning deactivated by the UE may be limited to positioning initiated at a positioning activation command by a BS. That is, the UE may continuously perform positioning triggered by other causes different from a positioning activation command requested by the BS.

If the positioning is deactivated, the UE may report to the network a fact that the positioning is deactivated.

8. Positioning Activation/Deactivation Based on RLF

A UE may determine to deactivate positioning if an RRC connection re-establishment procedure is initiated according to an RLF occurrence. The positioning deactivated by the UE may be limited to positioning initiated at a positioning activation command by a BS. That is, the UE may continuously perform positioning triggered by other causes different from the positioning activation command requested by the BS. If the positioning is deactivated, the UE may report to the network a fact that the positioning is deactivated.

The aforementioned various positioning activation/deactivation conditions may be applied by combining one or more of them. The UE may consider one or more conditions, and if all of the corresponding conditions are satisfied, may activate or deactivate the positioning.

The UE may perform a measurement report on the basis of selective positioning activation or deactivation as described above. Hereinafter, a measurement report method based on selective positioning is described.

Figure 15:
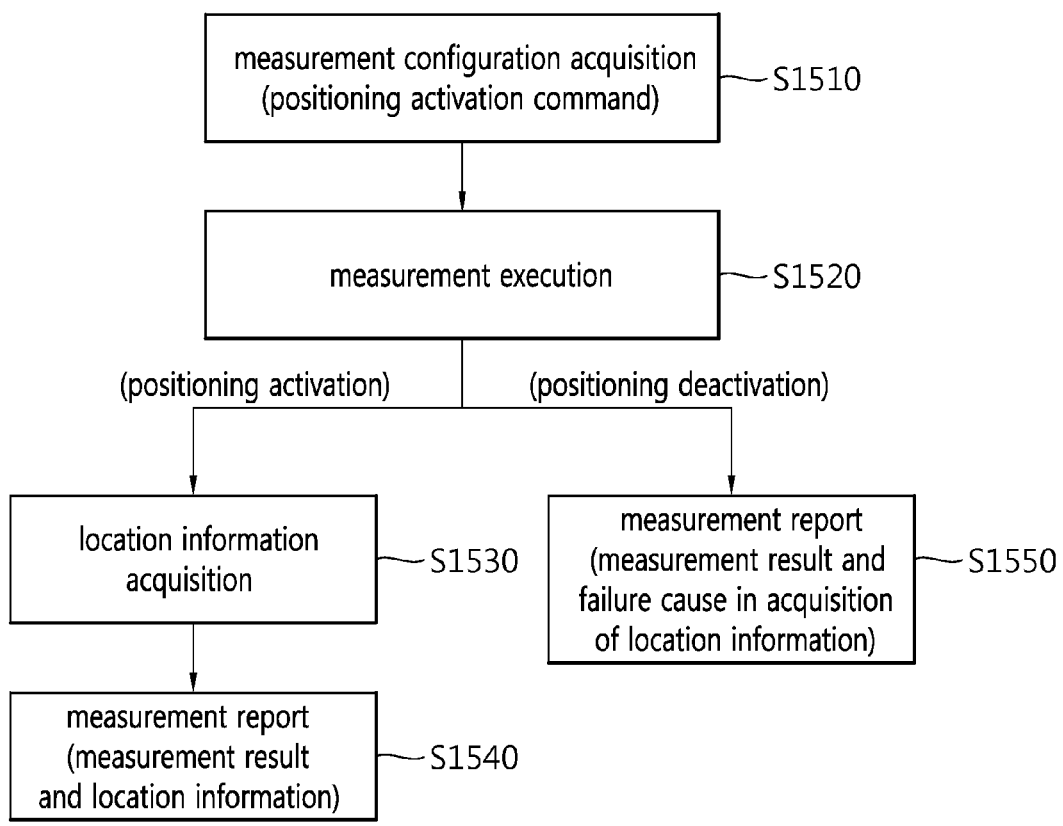
FIG. 15 shows a measurement report method according to an embodiment of the present invention.

FIG. 15 shows a measurement report method according to an embodiment of the present invention.

Referring to FIG. 15, a measurement configuration is received (step S1510). The measurement configuration may include control information required by a UE to perform a measurement and to report a measurement result. The measurement configuration may be configuration information for a positioning activation command. The UE may determine whether to activate positioning through the measurement configuration. The measurement configuration may include information that can be used to determine whether to activate/deactivate the aforementioned UE positioning. The information may be a threshold, a cell/tracking area/PLMN list, etc.

The UE performs the measurement on the basis of the measurement configuration (step S1520). The UE may acquire a measurement result regarding a serving cell and/or a neighboring cell.

During the measurement is performed, the UE may activate or deactivate the positioning according to a condition for positioning activation/deactivation. The UE may acquire location information related to a measurement result only for a case where the positioning is activated.

If the positioning is activated, the UE acquires the location information related to the measurement result (step S1530). Positioning for acquiring the location information may be based on the aforementioned a network-assisted GNSS method, a downlink positioning method, an enhanced cell ID method, and other positioning methods.

When the measurement report is performed, the UE may transmit to a network a measurement report message including a measurement result and location information related thereto (step S1540).

If the positioning is deactivated, the UE may fail to acquire the location information related to the measurement result. The UE may transmit a measurement report message including the measurement result to the network (step S1550). The UE may allow a measurement report message to further include a failure cause indicator indicating a cause of a failure in the acquisition of the location information related to the measurement result.

The failure cause indicator may indicate that the positioning is deactivated by the user. For example, if the positioning is deactivated according to a validity of a user consent, the failure cause indicator may indicate that the positioning is deactivated by the user. In addition, if the user directly deactivates the positioning, the failure cause indicator may indicate that the positioning is deactivated by the user.

The failure cause indicator may indicate that the positioning is deactivated by an autonomous decision of the UE. For example, if a network configuration for a battery threshold is not received and a remaining battery level of the UE is lower than a specific threshold, the UE may autonomously deactivate the positioning. In this case, the failure cause indicator may indicate the positioning deactivation by the autonomous decision of the UE.

The failure cause indicator may indicate that it fails to acquire proper information for a location calculation. For example, the UE may fail to receive a positioning signal or to synchronize a positioning reference time. In this case; the failure cause indicator may indicate that it fails to acquire the proper information for the location calculation.

The aforementioned measurement report method may be easily applied not only to an immediate MDT or RLF report which reports a single measurement result to a network but also to a logged MDT which reports one or more measurement results to the network together. Hereinafter, an example of applying the measurement report method of the present invention is described in greater detail with reference to the accompanying drawings.

Figure 16:
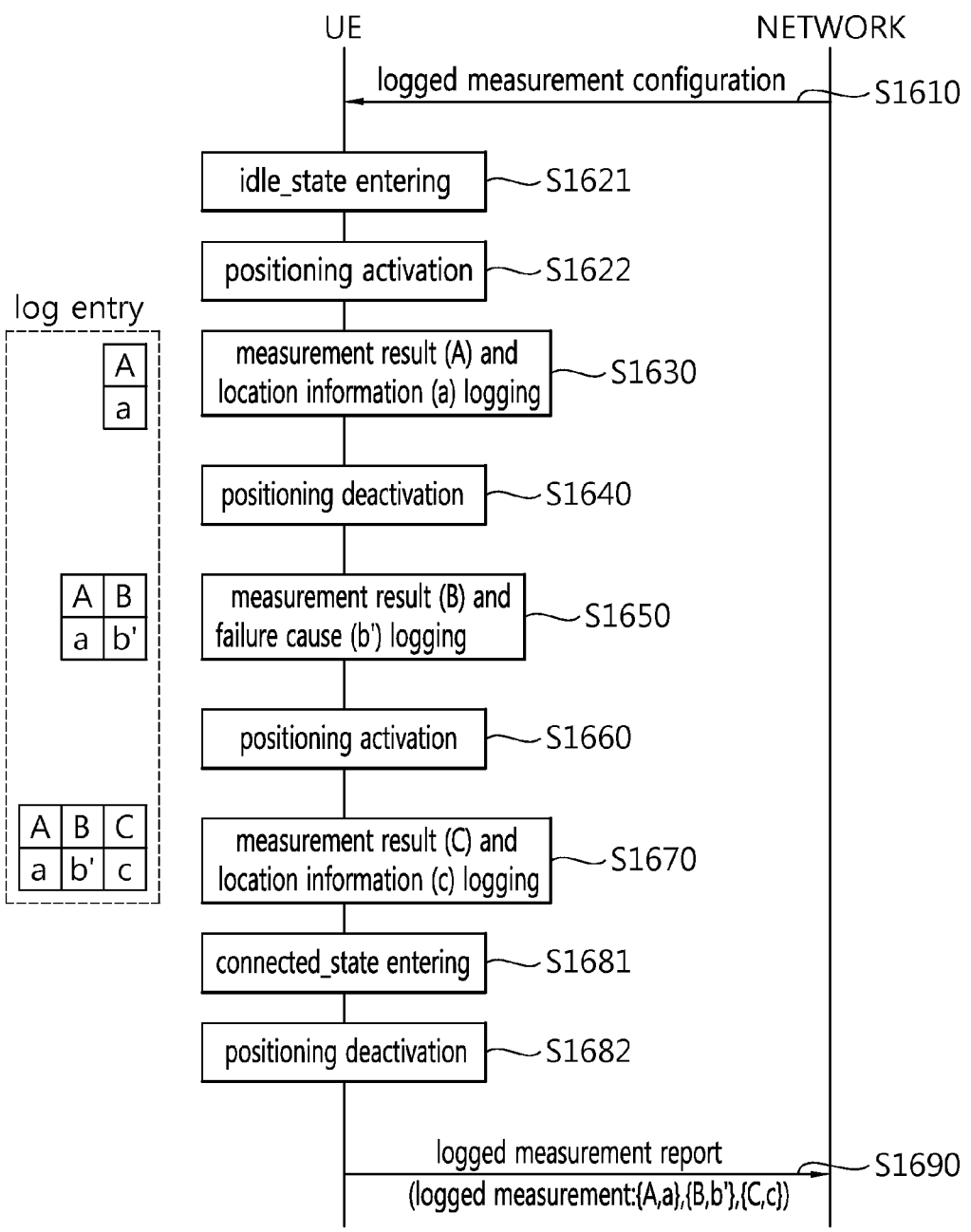
FIG. 16 shows an example of a measurement report method according to an embodiment of the present invention.

FIG. 16 shows an example of a measurement report method according to an embodiment of the present invention. In the example of FIG. 16, the proposed measurement report method is applied to a logged MDT.

Referring to FIG. 16, a UE receives a logged measurement configuration from a network (step S1610). The logged measurement configuration may include information for performing a logged MDT operation. The logged measurement configuration may be implemented similarly to the logged measurement configuration provided in the aforementioned logged MDT operation with reference to FIG. 8, and a detailed description thereof is omitted.

The logged measurement configuration may perform a function as a positioning activation command. Therefore, the UE acquires the logged measurement configuration and determines whether to activate positioning. The logged MDT is based on an operation in which the UE logs a measurement result and/or location information in an RRC_IDLE state and repots to the network a logged measurement in an RRC_CONNECTED state. Therefore, when the UE determines whether to activate the positioning, a validity of a logged measurement configuration as a positioning activation command and an RRC state of the UE may be considered. The UE may receive the logged measurement configuration and enter the RRC_IDLE state (step S1621), and thus may activate the positioning (step S1622).

The UE may acquire a measurement result on the basis of the logged measurement configuration, and acquires location information related thereto (step S1630). Since the positioning is activated, the UE may acquire a measurement result (A) and location information (a) related thereto. The UE may log the measurement result (A) and the location information (a). Accordingly, a log entry {A, a} may be created.

The UE may deactivate the positioning during the logged MDT is performed (step S1640). The UE may deactivate the poisoning on the basis of the aforementioned positioning activation/deactivation condition. Regarding the logged MDT, the UE may deactivate the positioning when being released from an RRC_IDLE state. The UE may deactivate the positioning when exiting an area based on area configuration information (i.e., a tracking area list and/or a PLMN list) for a logged MDT operation in a logged measurement configuration. The UE may deactivate the positioning if a validity of a user consent is lost for positioning triggered by the logged measurement configuration. The UE may deactivate the positioning if a remaining battery level of the UE is less than a specific threshold.

Even in a situation where the positioning is deactivated, the UE acquires a measurement result and performs logging (step S1650). If it fails to acquire location information related to the acquired measurement result, the UE may log a failure cause in the acquisition of the location information together with the measurement result. In the present example, the UE acquires a measurement result (B), but fails to acquire location information. Therefore, the UE may log a failure cause (b') together with the measurement result (B). In the present example, the failure cause (b') may indicate a cause of positioning deactivation. For example, if the positioning is deactivated when exiting an area for a logged MDT operation based on a logged measurement configuration, the UE may log the failure cause (b') indicating this together with the measurement result (B). Accordingly, a new log entry {B, b'} may be created.

The UE may activate the deactivated positioning during the logged MDT is performed (step S1660). The UE may activate the positioning on the basis of the aforementioned positioning activation/deactivation. Regarding the logged MDT, the UE may activate the positioning when entering an RRC_IDLE state. The UE may activate the positioning when entering an area based on area configuration information (i.e., a tracking area list and/or a PLMN list) for a logged MDT operation in a logged measurement configuration. The UE may activate the positioning if a validity of a user consent is guaranteed for positioning triggered by the logged measurement configuration.

The UE may acquire a measurement result on the basis of the logged measurement configuration, and acquires location information related thereto (step S1670). Since the positioning is activated, the UE may acquire a measurement result (C) and location information (c) related thereto. The UE may log the measurement result (C) and the location information (c). Accordingly, a log entry {C, c} may be created.

The UE may enter the RRC_CONNECTED state (step S1681), and may deactivate the positioning (step S1682). The entering of the RRC_CONNECTED state of the UE may be based on an elapse of a logging duration time of a logged measurement configuration. When the positioning is deactivated, the UE may report to the network a fact that the positioning is deactivated.

The UE transmits the logged measurement report to the network (step S1690). The logged measurement report may include logged log entries in steps S1630, S1650, and S1670. Accordingly, the logged measurement report may include logged measurements {A, a}, {B, b'}, and {C, c} based on the log entry. In addition, the logged measurement report may include information for reporting that the positioning is deactivated in step S1682.

Figure 17:
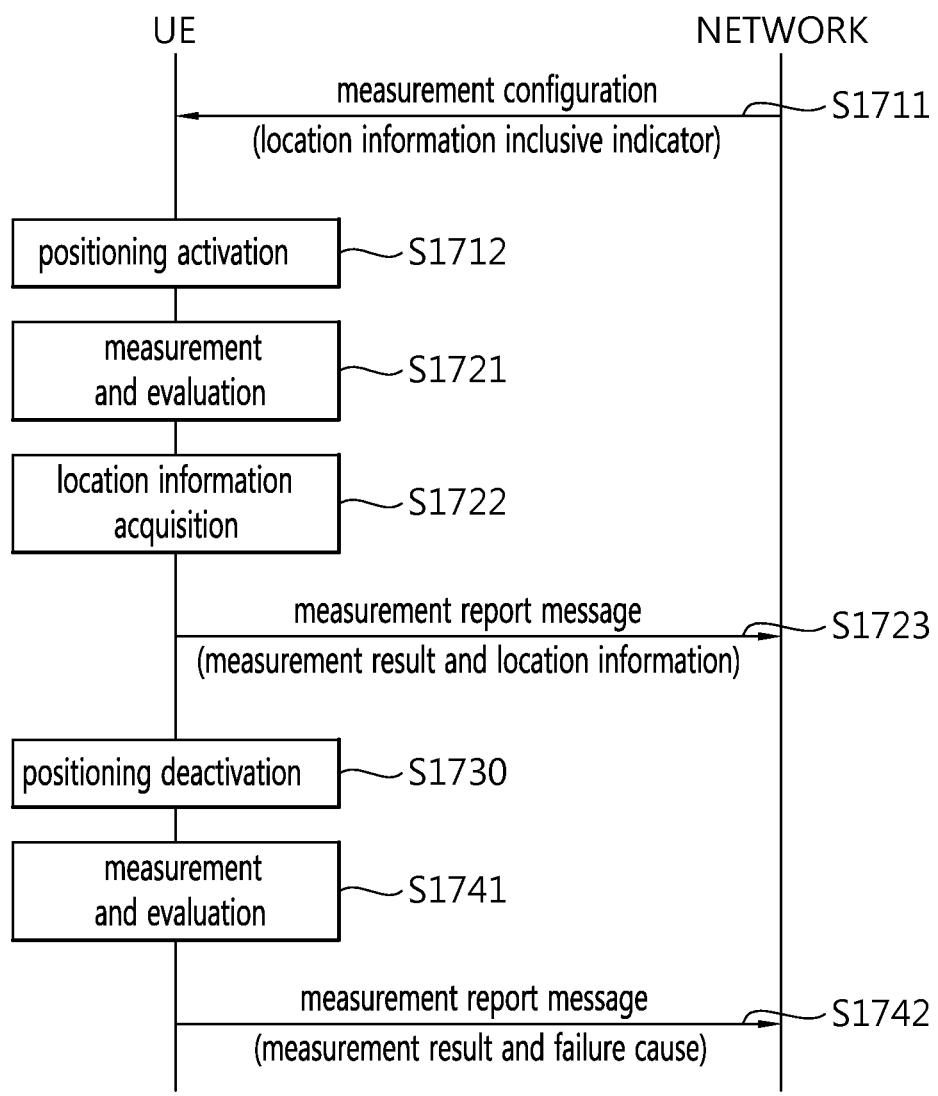
FIG. 17 shows another example of a measurement report method according to an embodiment of the present invention.

FIG. 17 shows another example of a measurement report method according to an embodiment of the present invention. In the example of FIG. 17, the proposed measurement report method is applied to an immediate MDT.

Referring to FIG. 17, a UE receives a measurement configuration from a network (step S1711). The measurement configuration may include information for a measurement and report of the UE such as a measurement target and a report configuration. The measurement configuration may include a location information inclusion indicator indicating that related location information needs to be included in the measurement report message together with the measurement result.

The logged measurement configuration including the location information inclusion indication may perform a function as a positioning activation command. Therefore, the UE may receive the measurement configuration and may activate the positioning (step S1712). Additionally, the UE may report to the network a fact that the positioning is activated.

The UE performs a measurement and evaluation based on the measurement configuration (step S1721). The UE may acquire the measurement result and may determine whether to report this. The UE may acquire location information related to the measurement result (step S1722).

The UE transmits a measurement report message to the network (step S1723). The measurement report message may include a measurement result and related location information.

The UE may determine whether to activate/deactivate the positioning while performing an immediate MDT. If the positioning deactivation condition is satisfied, the UE may deactivate an activated positioning function (step S1730). When entering an RRC_IDLE state, the UE may determine to deactivate the positioning. The UE may determine to deactivate the positioning if a remaining battery level is less than a specific threshold. The UE may determine to deactivate the positioning if a validity of a user consent for the measurement configuration is lost.

Even in a situation where the positioning is deactivated, the UE performs a measurement and evaluation based on the measurement configuration (step S1741). The UE may acquire the measurement result and may determine whether to report this. Meanwhile, since the positioning is deactivated, the UE cannot acquire location information related to the measurement result.

The UE transmits a measurement report message to the network (step S1742). The UE may allow a measurement report message to include a measurement result. Additionally, the UE may allow the measurement report message to further include a failure cause indicator indicating a failure cause in the acquisition of the location information related to the measurement result.

In a measurement report method according to an embodiment of the present invention, a UE may perform selective positioning on the basis of a condition for positioning activation/deactivation. Accordingly, since the UE can report location information related to a measurement result to the network by performing necessary positioning, network performance can be optimized. In addition, unnecessary positioning is excluded so that unnecessary battery consumption can be avoided and unnecessary radio resource occupation can be prevented. A more effective measurement report method can be provided by using such an operation.

Figure 18:
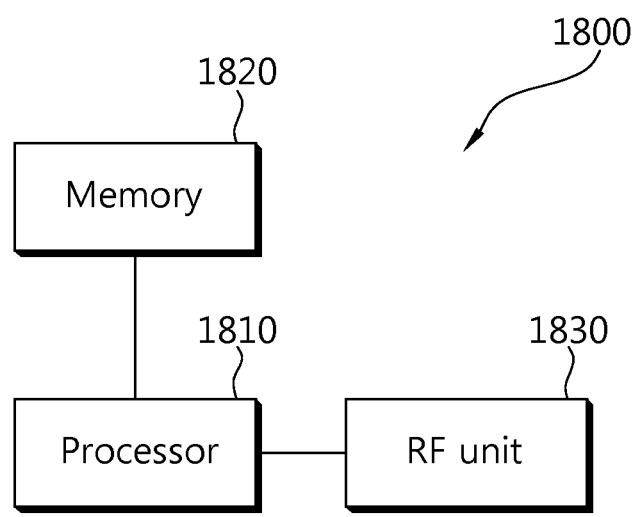
FIG. 18 is a block diagram showing a wireless device according to an embodiment of the present invention.

FIG. 18 is a block diagram showing a wireless device according to an embodiment of the present invention. The device may be configured to perform a method of evaluating a correlation between a measurement result and location information according to an embodiment of the present invention with reference to FIG. 15 to FIG. 17.

A wireless device 1800 may be implemented with a UE, BS, and collecting network for performing the correlation evaluation method according to the embodiment of the present invention.

The wireless device 1800 includes a processor 1810, a memory 1820, and a radio frequency (RF) unit 1830. The processor 1810 implements the proposed functions, procedures, and/or methods. The processor 1810 may be configured to perform selective positioning through a positioning activation/deactivation condition according to the embodiment of the present invention. The processor 1810 may be configured to perform a measurement and report based on the selective positioning. The processor 1810 may be configured to implement the aforementioned embodiment of the present invention with reference to FIG. 15 to FIG. 17.

The RF unit 1830 coupled to the processor 1810 transmits/receives a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for performing a measurement report in a wireless communication system, the method comprising:
receiving, by a terminal, a measurement configuration for acquiring a measurement result:

acquiring, by the terminal, the measurement result based on the measurement configuration;
activating or deactivating a positioning for acquiring location information,
wherein the positioning is activated if the measurement configuration indicates an acquisition of the location information and if a user consent for the acquisition of the location information is valid,
wherein the positioning is deactivated if the measurement configuration indicates the acquisition of the location information and if the user consent for the acquisition of the location information is not valid, and
wherein the user consent is valid if the terminal camps on a specific cell in a specific cell list; and
transmitting a measurement report message to a network,
wherein if the positioning is activated, the measurement report message includes the measurement result and the location information related to the measurement result, and
wherein if the positioning is not activated, the measurement report message includes only the measurement result.

2. The method of claim 1, wherein if the positioning is not activated, the measurement report message further includes a failure cause indicator indicating a failure cause in the acquisition of the location information related to the measurement result.

3. The method of claim 1, wherein the specific cell list is related to a specific tracking area list.

4. The method of claim 1, wherein the specific cell list is related to a public land mobile network (PLMN) list.

5. The method of claim 1, wherein the positioning is further activated if a remaining battery level of the terminal is greater than or equal to a specific threshold, and
wherein the positioning is further deactivated if the remaining battery level of the terminal. is less than the specific threshold.

6. The method of claim 1, wherein the positioning is further activated if the measurement configuration indicates the acquisition of the location information and the terminal is in a radio resource control (RRC)_CONNECTED state.

7. The method of claim 6, wherein the activated positioning is deactivated if the terminal enters an RRC_IDLE state.

8. The method of claim 1, wherein the measurement configuration is related to a logged minimization driving test (MDT) configuration.

9. The method of claim 8, wherein the activated positioning is deactivated if the terminal enters an RRC_CONNECTED state.

10. The method of claim 8, wherein the measurement configuration includes information indicating a time duration during which the terminal performs a measurement and logging, and further comprising deactivating the activated positioning if the time duration elapses from a time of receiving the logged measurement configuration.

11. A terminal for reporting a measurement result, the terminal comprising:
a radio frequency (RF) unit for transmitting and receiving a radio signal; and
a processor operatively coupled to the RE unit, wherein the processor is configured for:
receiving a measurement configuration for acquiring a measurement result:,
acquiring the measurement result based on the measurement configuration:
activating or deactivating a positioning for acquiring location information, wherein the positioning is activated if the measurement configuration indicates an acquisition of the location information and if a user consent for the acquisition of the location information is valid, wherein the positioning is deactivated if the measurement configuration indicates the acquisition of the location information and if the user consent for the acquisition of the location information is not valid, and wherein the user consent is valid if the terminal camps on a specific cell in a specific cell list; and transmitting a measurement report message to a network, wherein if the positioning is activated, the measurement report message includes the measurement result and the location information related to the measurement result, and wherein if the positioning is not activated, the measurement report message includes only the measurement result.

* * * * *